(12) United States Patent
Ushio et al.

(10) Patent No.: US 10,789,951 B2
(45) Date of Patent: Sep. 29, 2020

(54) SPEECH CONTINUATION DETERMINATION METHOD, SPEECH CONTINUATION DETERMINATION DEVICE, AND RECORDING MEDIUM

(71) Applicant: Panasonic Intellectual Property Management Co., Ltd., Osaka (JP)

(72) Inventors: Takashi Ushio, Tokyo (JP); Katsuyoshi Yamagami, Tokyo (JP); Mitsuru Endo, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 278 days.

(21) Appl. No.: 15/989,603

(22) Filed: May 25, 2018

(65) Prior Publication Data

US 2018/0366120 A1 Dec. 20, 2018

(30) Foreign Application Priority Data

Jun. 14, 2017 (JP) .................................. 2017-117084

(51) Int. Cl.
| | | |
|---|---|---|
| G10L 15/00 | (2013.01) | |
| G10L 15/22 | (2006.01) | |
| G10L 15/06 | (2013.01) | |
| G10L 15/16 | (2006.01) | |
| G10L 15/24 | (2013.01) | |
| G10L 25/30 | (2013.01) | |
| G10L 15/08 | (2006.01) | |

(52) U.S. Cl.
CPC ............ *G10L 15/22* (2013.01); *G10L 15/063* (2013.01); *G10L 15/16* (2013.01); *G10L 15/24* (2013.01); *G10L 25/30* (2013.01); *G10L 2015/088* (2013.01)

(58) Field of Classification Search
CPC combination set(s) only.
See application file for complete search history.

(56) References Cited

FOREIGN PATENT DOCUMENTS

| | | |
|---|---|---|
| JP | 2006-251545 | 9/2006 |
| JP | 2017-010207 | 1/2017 |

OTHER PUBLICATIONS

Antoine Raux et al: "Optimizing Endpointing Thresholds using Dialogue Features in a Spoken Dialogue System", Proceedings of the 9th Sigdial Workshop on Discourse and Dialogue, Sigdial '08, Association for Computational Linguistics, Morristown, NJ, USA, Jun. 19, 2008 (Jun. 19, 2008), pp. 1-10, XP058324209.

(Continued)

*Primary Examiner* — Vu B Hang
(74) *Attorney, Agent, or Firm* — Greenblum & Bernstein, P.L.C.

(57) ABSTRACT

A speech continuation determination method includes acquiring dialogue data including a system sentence spoken to a user at a first time, a user sentence spoken by the user at a second time following the system sentence, and system intention indicating intention of the system sentence; estimating a predicted response delay amount indicating a wait time for a response to the user sentence by applying the dialogue data to a model obtained by machine learning; acquiring user status information indicating the status of the user; and determining whether a speech sentence by the user continues following the user sentence in accordance with the user status information in the wait time indicated by the predicted response delay amount.

11 Claims, 16 Drawing Sheets

(56) References Cited

OTHER PUBLICATIONS

Antoine Raux: "Flexible Turn-Taking for Spoken Dialog Systems", PhD Thesis, Dec. 31, 2008 (Dec. 31, 2008), XP055371340, Retrieved from the Internet: URL:http://www.cs.cmu.edu/~antoine/thesis_antoine.pdf [retrieved on May 10, 2017].

FIG. 3

| DATA ID | SYSTEM INTENTION | SYSTEM SENTENCE | USER SENTENCE | RESPONSE DELAY AMOUNT |
|---|---|---|---|---|
| 1 | YES/NO QUESTION <KAISENDON> | DO YOU WANT TO EAT KAISENDON? | I HAD FISH FOOD YESTERDAY, | 1 |
| 2 | CONFIRMATION QUESTION | ANY OTHER SUGGESTIONS? | I WANT TO EAT MEAT | 0 |
| 3 | = YES/NO QUESTION <CHICKEN> | DO YOU LIKE CHICKEN? | YES | 0 |
| 4 | OPEN QUESTION | HELLO, WHAT DO YOU WANT TO EAT? | HELLO | 1 |
| 5 | CONFIRMATION QUESTION | ANY OTHER SUGGESTIONS? | I PREFER JAPANESE FOOD | 0 |
| ... | ... | ... | ... | ... |

FIG. 5

| DATA ID | SYSTEM INTENTION | SYSTEM SENTENCE | USER SENTENCE |
|---|---|---|---|
| 1 | YES/NO QUESTION <CHINESE FOOD> | DO YOU WANT TO EAT CHINESE FOOD? | I'VE JUST HAD CHINESE FOOD, |
| 2 | CONFIRMATION QUESTION | ANY OTHER SUGGESTIONS? | I WANT TO EAT MEAT |
| 3 | YES/NO QUESTION <PASTA> | DO YOU LIKE PASTA? | YES! |
| 4 | OPEN QUESTION | HELLO, WHAT DO YOU WANT TO EAT? | HELLO |
| 5 | CONFIRMATION QUESTION | ANY OTHER SUGGESTIONS? | I PREFER NOODLE |

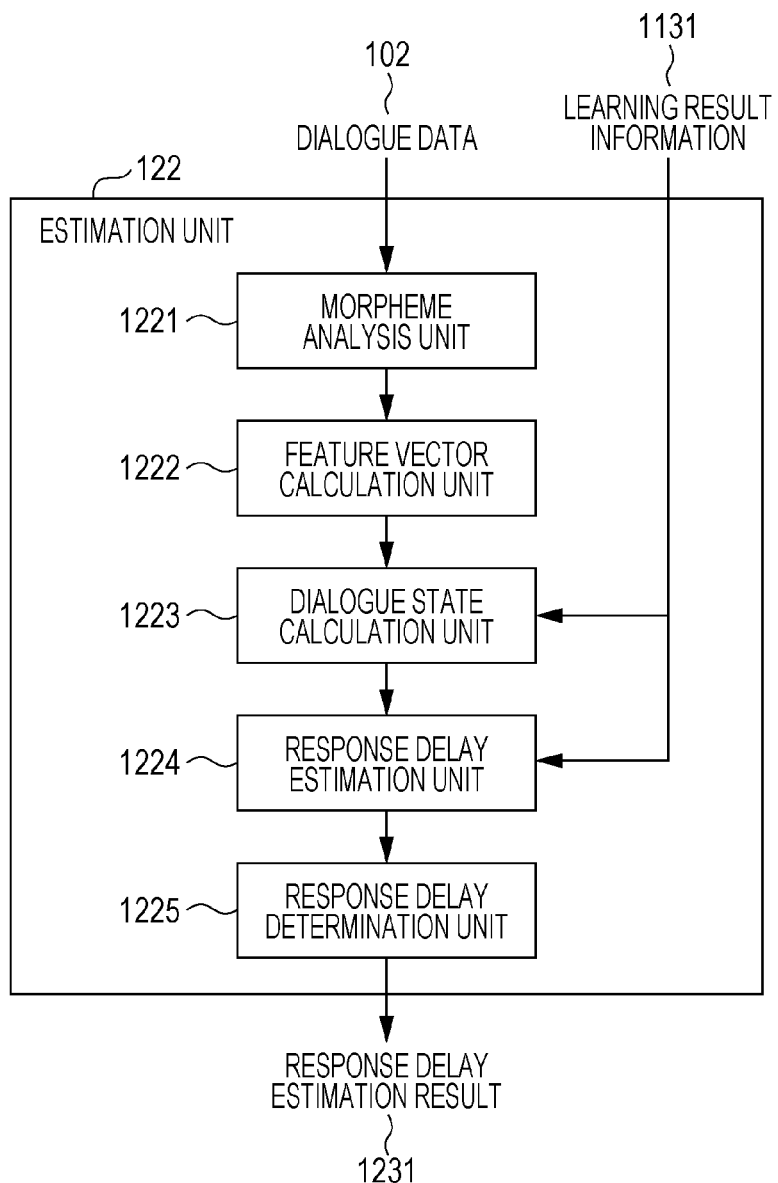

FIG. 7

| DATA ID | SYSTEM INTENTION | SYSTEM SENTENCE | USER SENTENCE | PREDICTED RESPONSE DELAY AMOUNT |
|---|---|---|---|---|
| 1 | YES/NO QUESTION <CHINESE FOOD> | DO YOU WANT TO EAT CHINESE FOOD? | I'VE JUST HAD CHINESE FOOD, | 1 |
| 2 | CONFIRMATION QUESTION | ANY OTHER SUGGESTIONS? | I WANT TO EAT MEAT | 0 |
| 3 | YES/NO QUESTION <PASTA> | DO YOU LIKE PASTA? | YES! | 0 |
| 4 | OPEN QUESTION | HELLO, WHAT DO YOU WANT TO EAT? | HELLO | 1 |
| 5 | CONFIRMATION QUESTION | ANY OTHER SUGGESTIONS? | I PREFER NOODLE | 0 |

FIG. 10

| DATA ID | SYSTEM INTENTION | SYSTEM SENTENCE | USER SENTENCE | PREDICTED RESPONSE DELAY AMOUNT | SPEECH CONTINUATION DETERMINATION |
|---|---|---|---|---|---|
| 1 | YES/NO QUESTION <CHINESE FOOD> | DO YOU WANT TO EAT CHINESE FOOD? | I'VE JUST HAD CHINESE FOOD, | 1 | 1 |
| 2 | CONFIRMATION QUESTION | ANY OTHER SUGGESTIONS? | I WANT TO EAT MEAT | 0 | 0 |
| 3 | YES/NO QUESTION <PASTA> | DO YOU LIKE PASTA? | YES! | 0 | 0 |
| 4 | OPEN QUESTION | HELLO, WHAT DO YOU WANT TO EAT? | HELLO | 1 | 0 |
| 5 | CONFIRMATION QUESTION | ANY OTHER SUGGESTIONS? | I PREFER NOODLE | 0 | 0 |

(EXEMPLARY FIRST DETERMINATION: NO DESIRE FOR SPEECH CONTINUATION)

(EXEMPLARY FIRST DETERMINATION: NO DESIRE FOR SPEECH CONTINUATION)

(EXEMPLARY SECOND DETERMINATION: DESIRE FOR SPEECH CONTINUATION)

SPEECH CONTINUATION DETERMINATION METHOD, SPEECH CONTINUATION DETERMINATION DEVICE, AND RECORDING MEDIUM

BACKGROUND

1. Technical Field

The present disclosure relates to a speech continuation determination method, a speech continuation determination device, and a recording medium, and particularly relates to a speech continuation determination method, a speech continuation determination device, and a recording medium that determine user speech continuation by using a predetermined model obtained by machine learning.

2. Description of the Related Art

A speech continuation determination technology estimates whether a user intends to continue speech, in other words, whether user speech continues. Some disclosed technologies (for example, Japanese Patent No. 4667085) dynamically control the timing and content of response by a dialogue system by using the speech continuation determination technology.

In the technology disclosed in Japanese Patent No. 4667085, a wait time until inputting by, for example, user speech is received, or a voice reception time in which the inputting is continuously received is adjusted based on calculation of the maximum number of characters in each keyword included in user speech assumed for each question provided by the dialogue system.

SUMMARY

In one general aspect, the techniques disclosed here feature a speech continuation determination method including: acquiring dialogue data including a first sentence that is text data of a first speech sentence spoken to a user at a first time, a second sentence that is text data of second speech sentence spoken by the user at a second time following the first sentence, and structured data that is data obtained by structuring intention indicated by the first sentence; estimating a response delay amount indicating a wait time for a response to the second sentence by applying the dialogue data to a model on which learning result information is acquired by machine learning reflected; acquiring user status information indicating the status of the user; and determining whether a speech sentence by the user continues following the second sentence in accordance with the user status information in the wait time indicated by the response delay amount.

The accuracy of determining user speech continuation is improved by a speech continuation determination method according to the present disclosure.

These comprehensive and specific aspects may be achieved by a system, a method, an integrated circuit, a computer program, or a recording medium such as a computer-readable CD-ROM, or may be achieved by an optional combination of the system, the method, the integrated circuit, the computer program, and the recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating exemplary learning data according to Embodiment 1;

FIG. 5 is a diagram illustrating exemplary dialogue data according to Embodiment 1;

FIG. 6 is a block diagram illustrating a detailed exemplary configuration of an estimation unit according to Embodiment 1;

FIG. 7 is a diagram illustrating an exemplary response delay estimation result according to Embodiment 1;

FIG. 10 is a diagram illustrating an exemplary speech continuation determination result according to Embodiment 1;

Figure 1:
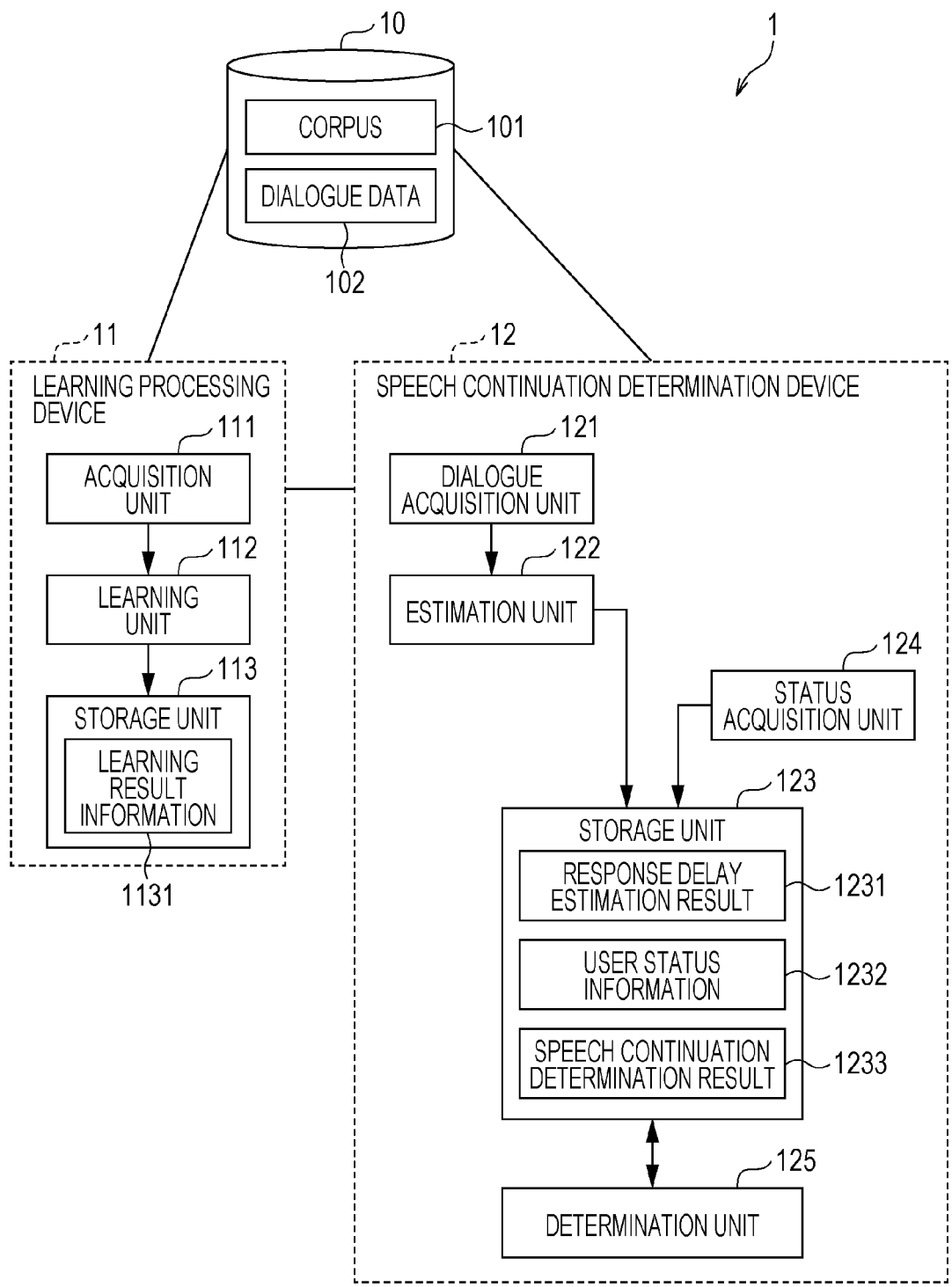
FIG. 1 is a block diagram illustrating an exemplary configuration of a speech continuation determination system according to Embodiment 1.

DETAILED DESCRIPTION (Underlying Knowledge Forming Basis of the Present Disclosure)

A speech continuation determination technology estimates whether a user intends to continue speech, in other words, whether user speech continues. The speech continuation determination technology is used to dynamically control the timing and content of response by a dialogue system. However, when the accuracy of the determination is poor, the dialogue system wrongly responds the same content or the content of a next question while the user intends to continue speech, which results in miss of the user speech. The wrong response leads to increase in the time of dialogue between the dialogue system and the user. Thus, the accuracy of the user speech continuation determination has been desired to be improved.

For example, Japanese Patent No. 4667085 discloses the technology of adjusting a wait time until voice reception and/or a voice reception time in which voice is continuously received based on a result of voice recognition grammar analysis on each question in accordance with a rule to use the maximum number of keyword characters assumed for the question. This technology can maintain smooth dialogue without generating a wait time (voice recognition) beyond a necessary duration for the user.

The technology disclosed in Japanese Patent No. 4667085 assumes that the maximum and minimum numbers of keywords to be received by the system all at once is naturally determined depending on a question. However, when free speech expression by the user is allowed, the number of keywords is zero or no maximum number is determined due to parallel speech of keywords in some cases, which makes it difficult to appropriately determine the wait time.

Thus, the above-described method disclosed in Japanese Patent No. 4667085 cannot perform the user speech continuation determination at a sufficient accuracy.

Accordingly, speech continuation needs to be determined the meaning of user speech content with taken into consideration to improve the accuracy of the user speech continuation determination.

The present disclosure is intended to solve the above-described problem by providing a speech continuation determination method, a speech continuation determination device, and a recording medium storing a computer program that improve the accuracy of user speech continuation determination.

An aspect of the present disclosure is a speech continuation determination method including: acquiring dialogue data including a first sentence that is text data of a first speech sentence spoken to a user at a first time, a second sentence that is text data of second speech sentence spoken by the user at a second time following the first sentence, and structured data that is data obtained by structuring intention indicated by the first sentence; estimating a response delay amount indicating a wait time for a response to the second sentence by applying the dialogue data to a model on which learning result information is acquired by machine learning reflected; acquiring user status information indicating the status of the user; and determining whether a speech sentence by the user continues following the second sentence in accordance with the user status information in the wait time indicated by the response delay amount.

According to the present aspect, the response delay amount for a user speech sentence is estimated by using a result of the learning processing, and whether user speech continues is determined by using the user status in a wait time indicated by the estimated response delay amount. In this manner, the accuracy of the user speech continuation determination is improved by performing the user speech continuation determination at two stages.

Preferably, in the aspect, the user status information indicates a value corresponding to at least one of (1) whether a text input field at a text input unit for inputting speech by the user in text is being selected, (2) whether a voice signal is being input at a voice input unit for inputting speech by the user by sound, (3) whether a position of the sight line of the user at a sight line detection unit for detecting the sight line of the user is on a device including a presentation unit presenting the first sentence, and (4) whether face and body directions of the user at a posture detection unit for detecting a posture of the user point to a device including a presentation unit presenting the first sentence.

Preferably, in the aspect, when the wait time indicated by the response delay amount is zero, the determining performs first determination indicating that the speech sentence by the user does not continue, and while the wait time indicated by the response delay amount is larger than zero, the determining performs second determination indicating that the speech sentence by the user continues when the user status information indicates a predetermined value in the wait time, or performs the first determination when the user status information does not indicate the predetermined value in the wait time.

Preferably, in the aspect, the speech continuation determination method further includes acquiring learning data including a third sentence that is text data of a third speech sentence spoken to the user, a fourth sentence that is text data of a fourth speech sentence spoken by the user following the third sentence, structured data that is data obtained by structuring intention indicated by the third sentence, and a response delay amount indicating a wait time for a response to the fourth sentence; causing the model to perform learning by using the learning data; and storing a result of the learning at the learning step as the learning result information, in which the learning causes the model to learn correspondence between the fourth sentence and the response delay amount by using, as teacher data, the response delay amount included in the learning data.

According to the present aspect, learning data including system intention of a past system speech sentence and a user speech sentence in response to the past system speech sentence is used to perform learning processing of learning the correspondence between the user speech sentence included in the learning data and a response delay amount for the user speech sentence by using the response delay amount as teacher data. Accordingly, the response delay amount is accurately estimated from the user speech sentence following the system speech sentence.

Preferably, in the aspect, the model includes: a first model that calculates a first feature vector of features such as a word included in a word string acquired through morpheme analysis on the fourth sentence, and a dialogue action and a keyword included in the structured data, and outputs a first characteristic vector representing a dialogue state of the fourth sentence based on the calculated first feature vector and a first weight parameter; and a second model that outputs a response delay amount for the fourth sentence based on the first characteristic vector and a second weight parameter, in which the learning causes the model to perform learning by using the learning data by updating the first weight parameter and the second weight parameter by an error backpropagation method based on error between the response delay amount output by the second model and the response delay amount included in the learning data.

Preferably, in the aspect, the first model includes a neural network that has the first weight parameter and calculates the first characteristic vector from the calculated first feature vector, and the second model is a neural network model that outputs sigmoid regression, a support vector machine (SVM) model, or a naive Bayes classifier.

Preferably, in the aspect, the learning acquires the learning data from a corpus accumulating a speech sentence spoken to a user, structured data of intention indicated by the speech sentence, a speech sentence spoken by the user following the speech sentence, and a response delay amount for the speech sentence spoken by the user.

Preferably, in the aspect, the intention indicated by the first sentence includes a dialogue action indicating the kind of the intention of the first sentence and obtained by classifying the first sentence based on categories and actions, and a keyword included in the first sentence.

Preferably, in the aspect, the intention indicated by the third sentence includes a dialogue action indicating the kind of the intention of the third sentence and obtained by classifying the third sentence based on categories and actions, and a keyword included in the third sentence.

An aspect of the present disclosure is a speech continuation determination device including: a dialogue acquisition unit that acquires dialogue data including a first sentence that is text data of a first speech sentence spoken to a user at a first time, a second sentence that is text data of second speech sentence spoken by the user at a second time following the first sentence, and structured data that is data obtained by structuring intention indicated by the first sentence; an estimation unit that estimates a response delay amount indicating a wait time for a response to the second sentence by applying the dialogue data to a model on which learning result information is acquired by machine learning reflected; a status acquisition unit that acquires user status information indicating the status of the user; and a determination unit that determines whether a speech sentence by the user continues following the second sentence in accordance with the user status information in the wait time indicated by the response delay amount.

According to the present aspect, the response delay amount for the user speech sentence is estimated by using a result of the learning processing, and whether user speech continues is determined by using a user status in a wait time indicated by the estimated response delay amount. In this manner, the accuracy of the user speech continuation determination is improved by performing the user speech continuation determination at two stages.

These comprehensive and specific aspects may be achieved by a system, a method, an integrated circuit, a computer program, or a recording medium such as a computer-readable CD-ROM, or may be achieved by an optional combination of the system, the method, the integrated circuit, the computer program, and the recording medium.

Embodiments of the present disclosure will be described below with reference to the accompanying drawings. The embodiments to be described below each indicate a specific example of the present disclosure. For example, numerical values, shapes, components, steps, and orders of the steps, which are indicated in the embodiments described below are merely exemplary and not intended to limit the present disclosure. Among components in the embodiments described below, any component not recited in an independent claim representing a highest-level concept is described as an optional component. Contents in all embodiments may be combined with each other.

Embodiment 1

The following describes a speech continuation determination method and the like in Embodiment 1 with reference to the accompanying drawings.

[Speech Continuation Determination System]

Figure 2:
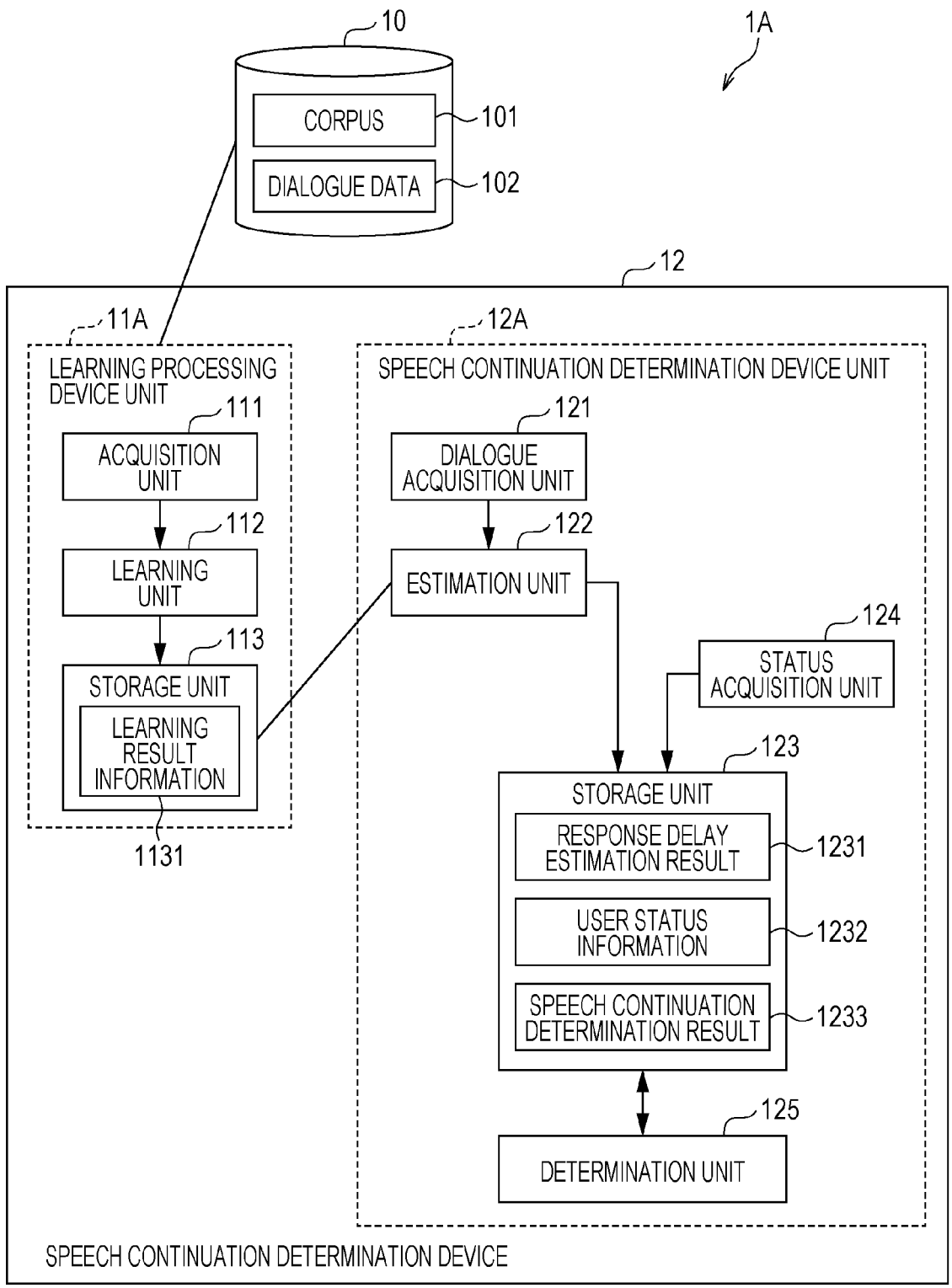
FIG. 2 is a block diagram illustrating another exemplary configuration of the speech continuation determination system according to Embodiment 1.

FIG. 1 is a block diagram illustrating an exemplary configuration of a speech continuation determination system 1 according to Embodiment 1. FIG. 2 is a block diagram illustrating another exemplary configuration of a speech continuation determination system 1A according to Embodiment 1. Any element identical to that in FIG. 1 is denoted by an identical reference sign.

The speech continuation determination system 1 illustrated in FIG. 1 includes a storage device 10, a learning processing device 11, and a speech continuation determination device 12.

<Storage Device 10>

The storage device 10 stores a corpus 101 and dialogue data 102. The corpus 101 is a database obtained by accumulating a large volume of text data representing speech in dialogue. In the present embodiment, the corpus 101 includes a plurality of pieces of learning data 1011. The learning data 1011 is used by the learning processing device 11 when performing learning processing.

The storage device 10 is achieved by non-transitory rewritable memory such as a hard disk drive or a solid state drive.

<Learning Processing Device 11>

The learning processing device 11 acquires at least one piece of the learning data 1011 from the corpus 101 stored in the storage device 10 and performs learning processing of a predetermined model for estimating a response delay amount indicating a wait time for a response to speech by a user. The learning processing device 11 is achieved by, for example, a computer.

<Speech Continuation Determination Device 12>

The following describes the configuration of the speech continuation determination device 12 according to the present embodiment.

The speech continuation determination device 12 acquires the dialogue data 102 from the storage device 10 and determines speech continuation by the user, in other words, whether the user desires to continue speech, by using a predetermined model obtained by machine learning by the learning processing device 11. The speech continuation determination device 12 is achieved by, for example, a computer.

The speech continuation determination system 1 according to Embodiment 1 is not limited to the configuration illustrated in FIG. 1. As illustrated in the speech continuation determination system 1A in FIG. 2, the speech continuation determination device 12 may include a learning processing device unit 11A that is a functional component corresponding to the learning processing device 11 illustrated in FIG. 1, and a speech continuation determination device unit 12A that is a functional component corresponding to the speech continuation determination device 12 illustrated in FIG. 1. Accordingly, the learning processing and the speech continuation determination processing may be both performed by the speech continuation determination device 12 illustrated in FIG. 2, or may be performed by different devices such as the learning processing device 11 and the speech continuation determination device 12, respectively, as illustrated in FIG. 1. The speech continuation determination device 12 illustrated in FIG. 2 may further include the storage device 10.

The following describes detailed configurations of the learning processing device 11 and the speech continuation determination device 12.

[Learning Processing Device 11]

As illustrated in, for example, FIG. 1, the learning processing device 11 includes an acquisition unit 111, a learning unit 112, and a storage unit 113.

<Storage Unit 113>

The storage unit 113 stores, as learning result information 1131, a result of learning by the learning unit 112. The storage unit 113 is achieved by a non-transitory rewritable memory such as a hard disk drive or a solid state drive.

<Acquisition Unit 111>

The acquisition unit 111 acquires learning data including a third sentence that is text data of a third speech sentence spoken to the user, a fourth sentence that is text data of a fourth speech sentence spoken by the user following the third sentence, structured data that is data obtained by structuring intention indicated by the third sentence, and a response delay amount indicating a wait time for a response to the fourth sentence.

The acquisition unit 111 acquires the learning data from the corpus 101 accumulating a speech sentence spoken to a user, structured data of intention indicated by the speech sentence, a speech sentence spoken by the user following the speech sentence, and a response delay amount for the speech sentence spoken by the user.

In the present embodiment, the acquisition unit 111 acquires at least one piece of the learning data 1011 from the corpus 101 stored in the storage device 10. The acquisition unit 111 is achieved by, for example, a processor such as a CPU, an ASIC, or an FPGA, and achieved by a processor such as a CPU executing a computer-readable program held in a computer.

FIG. 3 is a diagram illustrating exemplary learning data 1011 according to Embodiment 1. As described above, the learning data 1011 illustrated in FIG. 3 is included in the corpus 101. In other words, the corpus 101 corresponds to accumulation of the learning data 1011.

The learning data 1011 includes a plurality of pieces of speech data each indicating a speech sentence by the user in response to a speech sentence by a system. The system may be the speech continuation determination system 1 or a dialogue system, a server, a device, or the like that generates dialogue or a response. FIG. 3 illustrates the learning data 1011 including a plurality of pieces of speech data of dialogue about meal advisement in Japanese.

As illustrated in FIG. 3, the learning data 1011 includes system intention 143, a system sentence 144, a user sentence 145, and a response delay amount 146, to which a data ID 142 is provided. The learning data 1011 includes training data 141 including at least one set of the system intention 143 to the response delay amount 146 to which the data ID 142 is provided. In the example illustrated in FIG. 3, the training data 141 includes the system intention 143 to the response delay amount 146 to which the data ID 142 indicating "1" is provided, but the present disclosure is not limited thereto.

The data ID 142 is an identifier for uniquely specifying the training data 141. The data ID 142 is used to uniquely specify the contents of the system intention 143 to the response delay amount 146.

The system sentence 144 is text data of one speech sentence indicating a sentence in one piece of speech by the system. More specifically, the system sentence 144 is text data of a speech sentence spoken to the user by the system, and an exemplary third sentence. The user sentence 145 is text data of one speech sentence indicating a sentence in one piece of speech by the user. More specifically, the user sentence 145 is text data of a speech sentence spoken by the user following the system sentence 144, and is an exemplary fourth sentence. The system sentence 144 ad the user sentence 145 are each string data of Japanese words without a delimiter. In a case of English text data, the system sentence 144 and the user sentence 145 may be each string data of English words with a delimiter of a half-width space.

The system intention 143 is data (structured data) obtained by structuring intention indicated by the system sentence 144. The structured data includes a dialogue action that indicates the kind of intention of a sentence indicated by the system sentence 144 and is obtained by classifying the sentence based on categories and actions, and a keyword included in the sentence indicated by the system sentence 144. Thus, it can be regarded that the system intention 143 indicates the meaning or outline of the system sentence 144. In the example illustrated in FIG. 3, the system intention 143 includes the dialogue action of the system sentence 144 such as "YES/NO question", "check question", or "open question", and a keyword such as <Kaisendon> or <Chicken>.

In an early phase of dialogue between the system and the user, the system intention 143 and the system sentence 144, which would be otherwise empty, are provided with "INIT", which is a string indicating an initial state.

The response delay amount 146 indicates whether there is a wait time for a response to the user sentence 145. At learning, the response delay amount 146 is used as teacher data for the user sentence 145 following the system sentence 144. As illustrated in FIG. 3, the response delay amount 146 is, for example, zero or one, but a fixed value (for example, five seconds) corresponding to each value (zero or one) may be used in actual delay control. The response delay amount 146 may be a numerical value indicating how long a response of the system to the user sentence 145 is to be delayed.

In the example illustrated in FIG. 3, when the training data 141, the data ID 142 of which indicates "1" is a target of the learning processing by the learning unit 112, the acquisition unit 111 acquires the system intention 143 of "YES/NO question <Kaisendon>", the system sentence 144 of "Do you want to eat Kaisendon?", and the user sentence 145 of "I had fish food yesterday,". Then, the acquisition unit 111 acquires "1" indicated as the response delay amount 146, the data ID 142 of which indicates "1", as a true value, in other words, teacher data at learning by using the training data 141.

The acquisition unit 111 acquires the training data 141 with a different value of the data ID 142 at each learning performed by the learning unit 112 until the learning converges. The acquisition unit 111 may acquire the training data 141 having a different value of the data ID 142 by incrementing the data ID 142, or may acquire any other training data 141.

<Learning Unit 112>

The learning unit 112 causes a predetermined model to perform learning by using the learning data 1011. More specifically, the learning unit 112 causes the predetermined model to learn correspondence between the user sentence 145 (fourth sentence) and the response delay amount 146 by using, as teacher data, the response delay amount 146 included in the learning data 1011. More specifically, in description with reference to FIG. 3, the learning unit 112 calculates a first characteristic vector indicating a dialogue state based on structured data indicated by a dialogue action and a keyword included in the system intention 143 and a word included in the user sentence 145 by applying the learning data 1011 acquired by the acquisition unit 111 to the predetermined model. Then, the correspondence between the user sentence 145 and the response delay amount 146 is learned by using the calculated first characteristic vector and a weight parameter. Then, the learning unit 112 stores a result of the learning as the learning result information 1131 in the storage unit 113.

In the present embodiment, the predetermined model includes a first model including a first weight parameter, and a second model including a second weight parameter. The first model calculates a first feature vector of features such as a word included in a word string acquired through morpheme analysis on the user sentence 145 (fourth sentence), and a dialogue action and a keyword included in the structured data of the system sentence 144 (third sentence), and outputs the first characteristic vector representing the dialogue state of the user sentence 145 (fourth sentence) based on the calculated first feature vector and the first weight parameter. For example, the first model includes a neural network that has the first weight parameter and calculates the first characteristic vector from the calculated first feature vector.

The second model outputs a response delay amount for the user sentence 145 (fourth sentence) based on the first characteristic vector and the second weight parameter. For example, the second model employs a neural network model that outputs sigmoid regression, a support vector machine (SVM) model, or a naive Bayes classifier.

The learning unit 112 causes the predetermined model to perform learning by using the learning data 1011 by updating the first weight parameter and the second weight parameter by an error backpropagation method based on error between the response delay amount output from the second model and the response delay amount 146 included in the learning data 1011. The learning unit 112 is achieved by, for example, a processor such as a CPU, an ASIC, or an FPGA, and achieved by a processor such as a CPU executing a computer-readable program held in a computer.

Figure 4:
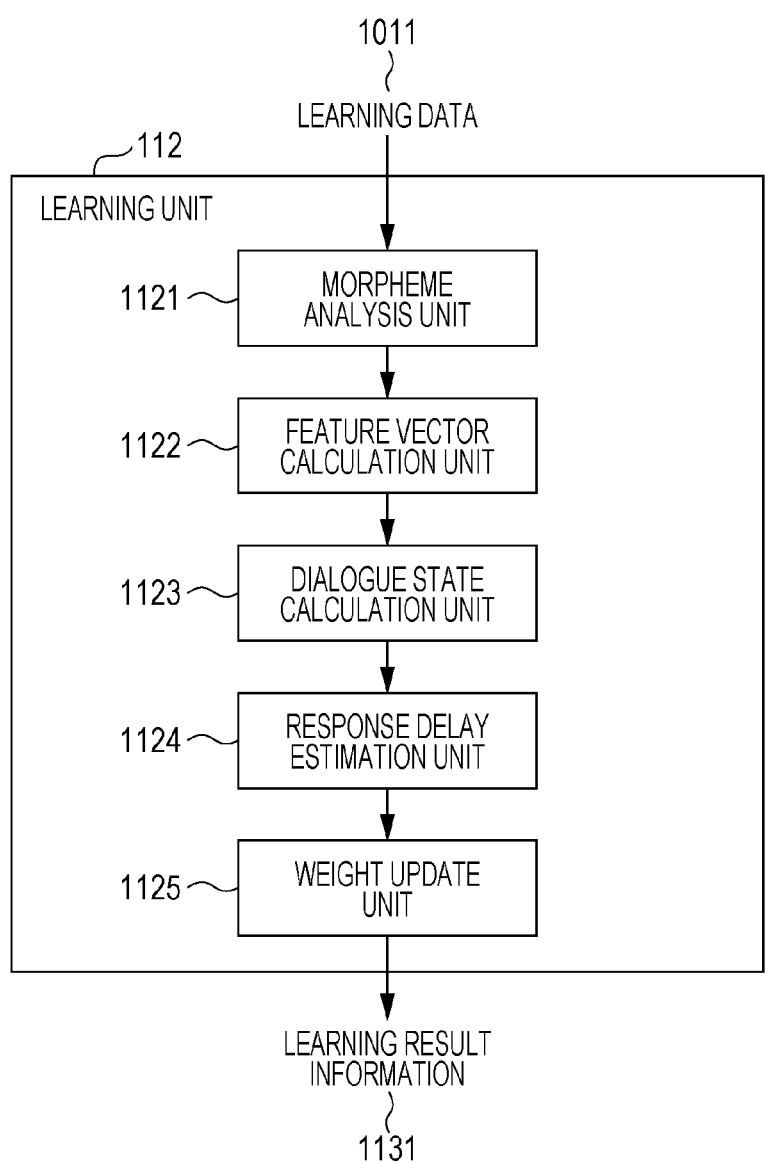
FIG. 4 is a block diagram illustrating a detailed exemplary configuration of a learning unit according to Embodiment 1.

FIG. 4 is a block diagram illustrating a detailed exemplary configuration of the learning unit 112 according to Embodiment 1.

As illustrated in FIG. 4, the learning unit 112 includes a morpheme analysis unit 1121, a feature vector calculation unit 1122, a dialogue state calculation unit 1123, a response delay estimation unit 1124, and a weight update unit 1125.

<<Morpheme Analysis Unit 1121>>

The morpheme analysis unit 1121 analyzes each morpheme, which is the minimum unit having meaning in natural language, in the user sentence 145 acquired by the acquisition unit 111, and converts the user sentence 145 into a word string including the morpheme as a word.

In the present embodiment, the morpheme analysis unit 1121 performs the conversion to a word string by dividing, into words, each user sentence 145 acquired by the acquisition unit 111. When the user sentence 145 is in Japanese, the morpheme analysis unit 1121 can achieve this processing by using a morpheme analysis application such as MeCab. For example, the morpheme analysis unit 1121 divides the user sentence 145 of "I had fish food yesterday, (kinousakanawotabetanode,)" into "kinou", "sakana", "wo", "tabe", "ta", "node", and ",". When the user sentence 145 is in English, the morpheme analysis unit 1121 can achieve this processing by using a half-width space as a word delimiter.

<<Feature Vector Calculation Unit 1122>>

The feature vector calculation unit 1122 converts a word string obtained by the morpheme analysis unit 1121, and a dialogue action and a keyword included in the system intention 143 into a feature vector that is a sentence vector expression in which the word string, the dialogue, and the keyword are expressed as features.

The conversion into a feature vector may be performed by a method using a Bag-of-words model that considers only whether any word is included in a sentence but not the order of words or the like. When the Bag-of-words model is used, the conversion into a feature vector can be achieved by, for example, expressing an element value as one only when each feature in a list (hereinafter also referred to as a dictionary) of all features assumed as inputs exists. Accordingly, the feature vector includes, as elements, all words, dialogue actions, and keywords included in the dictionary, which are each expressed as one or zero.

<<Dialogue State Calculation Unit 1123>>

The dialogue state calculation unit 1123 calculates, by using the first model included in the predetermined model, the first characteristic vector indicating a dialogue state from the feature vector calculated by the feature vector calculation unit 1122.

In the present embodiment, the dialogue state calculation unit 1123 calculates, by using the first model, the first characteristic vector indicating a dialogue state based on the feature vector calculated by the feature vector calculation unit 1122 and the first weight parameter. The first model may be one neural network model that outputs sigmoid regression and can calculate the first characteristic vector from the first feature vector.

<<Response Delay Estimation Unit 1124>>

The response delay estimation unit 1124 estimates a response delay amount for the user sentence 145 from the first characteristic vector calculated by the dialogue state calculation unit 1123 by using the second model included in the predetermined model.

In the present embodiment, the response delay estimation unit 1124 calculates a posterior probability indicating probability distribution of the response delay amount (zero or one) for the user sentence 145 based on the first characteristic vector calculated by the dialogue state calculation unit 1123 and the second weight parameter by using the second model.

The second model is a probability model such as a sigmoid regression model, an SVM model, or a naive Bayes classifier. The second model may be one neural network model that outputs sigmoid regression and can estimate the response delay amount from the first characteristic vector.

<<Weight Update Unit 1125>>

The weight update unit 1125 updates the first weight parameter and the second weight parameter of the predetermined model based on error between the response delay amount estimated by the response delay estimation unit 1124 and the response delay amount 146 included in the learning data 1011.

In description with reference to FIG. 3, the weight update unit 1125 updates the first weight parameter and the second weight parameter of the predetermined model to appropriate numerical values by the error backpropagation method based on the posterior probability of the response delay amount calculated by the response delay estimation unit 1124 in the training data 141 as a learning target and the true value indicated as the response delay amount 146 to which the data ID 142 included in the training data 141 is provided. In other words, the weight update unit 1125 updates the first weight parameter and the second weight parameter so that prediction error between the posterior probability and the true value is minimized. The weight update unit 1125 may determine that the prediction error is minimized and end the update when the prediction error is not further reduced.

In this manner, the learning unit 112 executes learning processing by performing learning to minimize the error between the posterior probability of the calculated response delay amount and the value indicated by the response delay amount 146 as a true value to which the data ID 142 indicated by the training data 141 is provided.

The learning unit 112 stores the first weight parameter and the second weight parameter (learning parameters) at the end of the learning processing as the learning result information 1131 in the storage unit 113.

[Speech Continuation Determination Device 12]

The following describes a detailed configuration of the speech continuation determination device 12.

As illustrated in, for example, FIG. 1, the speech continuation determination device 12 includes a dialogue acquisition unit 121, an estimation unit 122, a storage unit 123, a status acquisition unit 124, and a determination unit 125.

<Storage Unit 123>

The storage unit 123 stores a response delay estimation result 1231, user status information 1232, and a speech continuation determination result 1233. The storage unit 123 is achieved by a non-transitory rewritable memory such as a hard disk drive or a solid state drive. The user status information 1232 and the speech continuation determination result 1233 will be described later in detail.

<Dialogue Acquisition Unit 121>

The dialogue acquisition unit 121 acquires dialogue data including a first sentence that is text data of a first speech sentence spoken to a user at a first time, a second sentence that is text data of a second speech sentence spoken by the user at a second time following the first sentence, and structured data that is data obtained by structuring intention indicated by the first sentence.

In the present embodiment, the dialogue acquisition unit 121 acquires the dialogue data 102 stored in the storage device 10. The dialogue data 102 includes a plurality of sets of a system speech sentence and a user speech sentence indicating a response to the speech sentence. The dialogue acquisition unit 121 is achieved by, for example, a processor such as a CPU, an ASIC, or an FPGA, and achieved by a processor such as a CPU executing a computer-readable program held in a computer.

FIG. 5 is a diagram illustrating exemplary dialogue data 102 according to Embodiment 1. The dialogue data 102 illustrated in FIG. 5 includes speech data representing dialogue about meal advisement in Japanese.

As illustrated in FIG. 5, the dialogue data 102 includes system intention 183, a system sentence 184, and a user sentence 185, to which a data ID 182 is provided. The dialogue data 102 includes speech data 181 including at least one set of the system intention 183 to the user sentence 185, to which the data ID 182 is provided. In other words, the speech data 181 is data that is a speech continuation determination target included in the dialogue data 102. In the example illustrated in FIG. 5, the speech data 181 includes the system intention 183, the system sentence 184, and the user sentence 185, the data ID 182 of which is "1".

The data ID 182 is an identifier for uniquely specifying the speech data 181. The data ID 182 is used to uniquely specify the contents of the system intention 183 to the user sentence 185.

Similarly to the system sentence 144, the system sentence 184 is text data of one speech sentence indicating a sentence in one piece of speech by the system. More specifically, the system sentence 184 is text data of a speech sentence spoken to the user by the system, and is an exemplary first sentence. Similarly to the user sentence 145, the user sentence 185 is text data of one speech sentence indicating a sentence in one piece of speech by the user. More specifically, the user sentence 185 is text data of a speech sentence spoken by the user following the system sentence 184, and is an exemplary second sentence.

Similarly to the system intention 143, the system intention 183 is data (structured data) obtained by structuring intention indicated by the system sentence 184.

The dialogue data 102 is generated based on a plurality of externally input speech sentences. For example, first, the system sentence 184 output from the system, the system intention 183 associated with the system sentence 184, and the user sentence 185 input in response to the system sentence 184 are obtained. Subsequently, the data ID 182 is uniquely provided to the system intention 183, the system sentence 184, and the user sentence 185. The unit of a plurality of speech sentences, in other words, one piece of speech is, for example, text transmitted to a receiver all at once when inputting is made through a text chat system, or a result of recognition up to generation of a continuous silent interval, which serves as trigger for voice recognition, when inputting is made through a voice dialogue system.

Although the dialogue data 102 is stored in the storage device 10 outside of the speech continuation determination device 12, the present disclosure is not limited thereto. The dialogue data 102 may be generated by the speech continuation determination device 12 based on an externally input user speech sentence. In other words, the dialogue data 102 may be generated by the speech continuation determination device 12 or another device.

In the example illustrated in FIG. 5, when the speech continuation determination target is the speech data 181, the data ID 182 of which indicates, for example, "1", the dialogue acquisition unit 121 acquires the system intention 183 of "YES/NO question <Chinese food>", the system sentence 184 of "Do you want to eat Chinese food?", and the user sentence 185 of "I've just had Chinese food,". In other words, the dialogue acquisition unit 121 acquires, as the dialogue data 102, the speech data 181 that is a speech continuation determination target, in other words, the system sentence 184 at a first time, the user sentence 185 spoken by the user following the system sentence 184 at a second time following the first time, and structured data that is data obtained by structuring intention indicated by the system sentence.

<Estimation Unit 122>

The estimation unit 122 estimates the response delay amount indicating a wait time for a response to the second sentence by applying the dialogue data to the predetermined model on which the learning result information 1131 acquired by machine learning by the learning processing device 11 is reflected.

More specifically, the estimation unit 122 estimates the response delay amount indicating a wait time for the user sentence 185 as an estimation target by using the predetermined model on which the learning result information 1131 stored in the storage unit 113 is reflected. The predetermined model has a structure identical to that of the model used by the learning unit 112. The estimation unit 122 stores the estimated response delay amount as the response delay estimation result 1231 in the storage unit 123.

The estimation unit 122 is achieved by, for example, a processor such as a CPU, an ASIC, or an FPGA, and is achieved by a processor such as a CPU executing a computer-readable program held in a computer.

FIG. 6 is a block diagram illustrating a detailed exemplary configuration of the estimation unit 122 according to Embodiment 1. Any element identical to that in FIG. 1 or any other drawing is denoted by an identical reference sign.

In the present embodiment, as illustrated in FIG. 6, the estimation unit 122 includes a morpheme analysis unit 1221, a feature vector calculation unit 1222, a dialogue state calculation unit 1223, a response delay estimation unit 1224, and a response delay determination unit 1225.

<<Morpheme Analysis Unit 1221>>

The morpheme analysis unit 1221 converts the user sentence 185 into a word string by analyzing morphemes of the user sentence 185 included in the dialogue data 102 (speech data 181) acquired by the dialogue acquisition unit 121 and dividing the user sentence 185 into words that are the morphemes.

The morpheme analysis is performed by the above-described method.

<<Feature Vector Calculation Unit 1222>>

The feature vector calculation unit 1222 converts the word string obtained through the conversion at the morpheme analysis unit 1221, and a dialogue action and a keyword included in the system intention 143 into a feature vector that is a sentence vector expression in which the word string, the dialogue action, and the keyword are expressed as features.

The feature vector conversion is performed by the above-described method.

<<Dialogue State Calculation Unit 1223>>

The dialogue state calculation unit 1223 calculates, by using the first model included in the predetermined model subjected to learning, the first characteristic vector indicating a dialogue state from the feature vector calculated by the feature vector calculation unit 1222 and the like. In the present embodiment, the dialogue state calculation unit 1223 reads the learning result information 1131 stored in the storage unit 123, reflects the learning result information 1131 onto the first weight parameter of the first model, and converts the learning result information 1131 into the first characteristic vector indicating a dialogue state based on the feature vector calculated by the feature vector calculation unit 1222 and the first weight parameter subjected to learning.

<<Response Delay Estimation Unit 1224>>

The response delay estimation unit 1224 estimates the response delay amount for the user sentence 185 from the first characteristic vector calculated by the dialogue state calculation unit 1223 and the like by using the second model included in the predetermined model subjected to learning. In the present embodiment, the response delay estimation unit 1224 reads the learning result information 1131 stored in the storage unit 123, reflects the learning result information 1131 onto the first weight parameter of the first model, and calculates the posterior probability indicating the probability distribution of the response delay amount (zero or one) for the user sentence 185 based on the first characteristic vector calculated by the dialogue state calculation unit 1223 and the second weight parameter subjected to learning.

<<Response Delay Determination Unit 1225>>

The response delay determination unit 1225 determines a predicted response delay amount based on the posterior probability of the response delay amount, which is estimated by the response delay estimation unit 1224. The response delay determination unit 1225 stores the determined predicted response delay amount as the response delay estimation result 1231 in the storage unit 123. For example, the response delay determination unit 1225 determines the predicted response delay amount to be a higher probability value among probability values of the response delay amount indicated by the posterior probability, and stores the probability value as the response delay estimation result 1231 in the storage unit 123.

FIG. 7 is a diagram illustrating an exemplary response delay estimation result 1231 according to Embodiment 1. Any element identical to that in FIG. 5 is denoted by an identical reference sign.

As illustrated in FIG. 7, the response delay estimation result 1231 includes an estimation result 191 indicating a predicted response delay amount 192 for each user sentence 185 included in the dialogue data 102 illustrated in FIG. 5. In other words, each estimation result 191 includes the system intention 183, the system sentence 184, the user sentence 185, and the predicted response delay amount 192, to which the data ID 182 is provided. The predicted response delay amount 192 is determined by the response delay determination unit 1225. For example, in FIG. 7, in the estimation result 191, the data ID 182 of which indicates "1", the predicted response delay amount 192 of "1" is indicated for the system intention 183 of "YES/NO question <Chinese food>", the system sentence 184 of "Do you want to eat Chinese food?", and the user sentence 185 of "I've just had Chinese food,".

<Status Acquisition Unit 124>

The status acquisition unit 124 acquires the user status information 1232 indicating a user status. In the present embodiment, the status acquisition unit 124 acquires at least the user status information 1232 included in a time until a wait time elapses, and stores the user status information 1232 in the storage unit 123. The user status information 1232 is used in speech continuation determination by the determination unit 125 to be described later.

Figure 8:
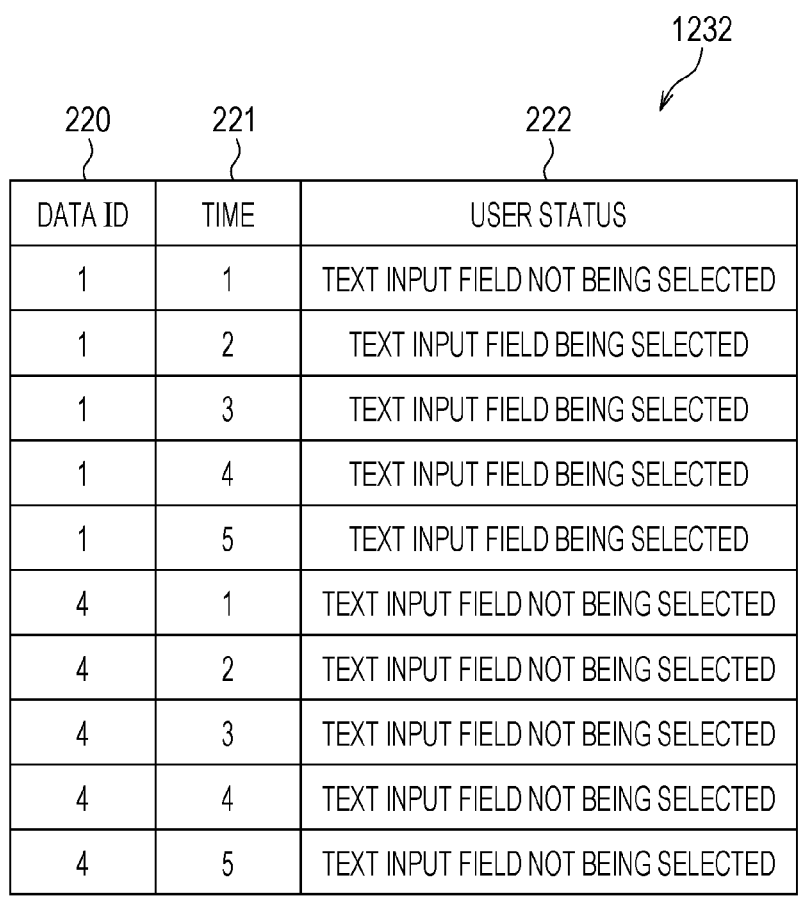
FIG. 8 is a diagram illustrating exemplary user status information according to Embodiment 1.

FIG. 8 is a diagram illustrating exemplary user status information 1232 according to Embodiment 1. As illustrated in FIG. 8, the user status information 1232 includes a data ID 220, a time 221, and a user status 222.

The data ID 220 indicates a correspondence relation with the data ID 182 illustrated in FIG. 7. An item with the number of "1" indicates the user status in the wait time for the data ID 182 indicating "1" in FIG. 7. The time 221 indicates an incremented time for the data ID 220 indicating the same number. In the example illustrated in FIG. 8, the time 221 indicates a time incremented at each second when the wait time is five seconds. The user status 222 indicates the user status at a time indicated by the time 221. The user status 222 indicates whether a text input field at a text input unit for inputting user speech by text is being selected.

The user status 222 does not necessarily need to indicate whether the text input field is being selected. The user status 222 may indicate whether a voice signal is being input at a voice input unit for inputting user speech by sound, or may indicate whether the position of the user sight line at a sight line detection unit for detecting a user sight line is on a device including a presentation unit presenting the system sentence 184 (first sentence). Alternatively, the user status 222 may indicate whether user face and body directions at a posture detection unit for detecting a user posture point to the device including the presentation unit presenting the system sentence 184 (first sentence). The user status information 1232 indicates a value corresponding to a sentence indicating the user status 222 as illustrated in FIG. 8. The value may indicate whether the user is performing an operation or a response for speech continuation, and may be, for example, zero or one. The user status information 1232 may be expressed in a sentence indicating the user status 222.

<Determination Unit 125>

The determination unit 125 determines whether a user speech sentence continues following the user sentence 185 (second sentence) in accordance with the user status information 1232 in a wait time indicated by the predicted response delay amount 192. More specifically, when the wait time indicated by the predicted response delay amount 192 is zero, the determination unit 125 may perform first determination indicating that the user speech sentence does not continue. While the wait time indicated by the predicted response delay amount 192 is larger than zero, the determination unit 125 performs second determination indicating that the user speech sentence continues when the user status information in the wait time indicates a predetermined value, or performs the above-described first determination when the user status information in the wait time does not indicate the predetermined value.

Figure 9:
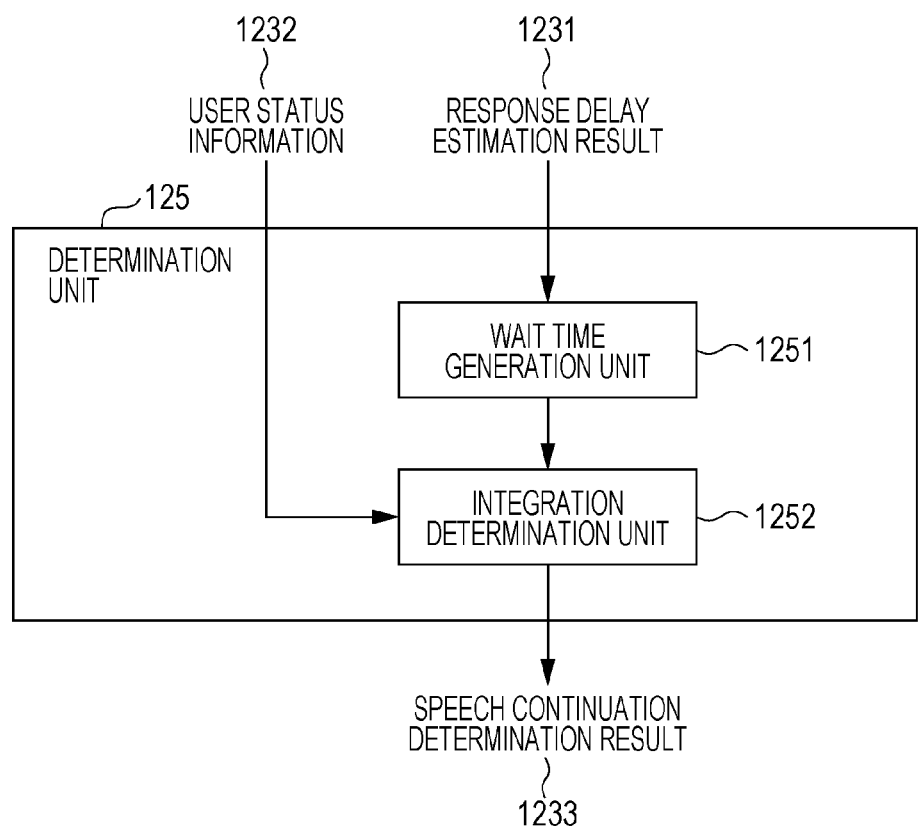
FIG. 9 is a block diagram illustrating a detailed exemplary configuration of a determination unit according to Embodiment 1.

FIG. 9 is a block diagram illustrating a detailed exemplary configuration of the determination unit 125 according to Embodiment 1. Any element identical to that in FIG. 1 or any other drawing is denoted by an identical reference sign.

In the present embodiment, as illustrated in FIG. 9, the determination unit 125 includes a wait time generation unit 1251 and an integration determination unit 1252. The determination unit 125 is achieved by, for example, a processor such as a CPU, an ASIC, or an FPGA, and is achieved by a processor such as a CPU executing a computer-readable program held in a computer.

<<Wait Time Generation Unit 1251>>

The wait time generation unit 1251 acquires the response delay estimation result 1231 stored in the storage unit 123, and delays outputting of the system sentence 184 following the user sentence 185 in accordance with whether there is a wait time indicated by the response delay estimation result 1231. For example, when the predicted response delay amount indicated by the response delay estimation result 1231 is "1", the wait time generation unit 1251 generates a command for transition to a "waiting state" and outputs the command to a system that outputs a system sentence. Accordingly, the wait time generation unit 1251 controls the system not to perform outputting of the system sentence 184 following the user sentence 185 until a predetermined wait time, for example, five seconds elapses.

<<Integration Determination Unit 1252>>

The integration determination unit 1252 determines whether user speech continues based on whether there is a wait time indicated by the response delay estimation result 1231 estimated by the estimation unit 122 and the user status 222 indicated by the user status information 1232 in the wait time.

For example, when the wait time indicated by the response delay estimation result 1231 is zero (no wait time), the integration determination unit 1252 determines that the user speech does not continue (first determination), and stores fragment information (also referred to as a speech discontinuation flag) indicating that the user speech does not continue as the speech continuation determination result 1233 in the storage unit 123.

For example, when the wait time indicated by the response delay estimation result 1231 is larger than one or zero (in other words, when the wait time is non zero), the integration determination unit 1252 further acquires the user status information 1232 in the wait time, which is stored in the storage unit 123. Then, when the user status information 1232 in the wait time indicates a predetermined value, the integration determination unit 1252 determines that the user speech continues (second determination), and stores fragment information (also referred to as a speech continuation flag) indicating that the user speech continues as the speech continuation determination result 1233 in the storage unit 123. When the user status information 1232 in the wait time does not indicate the predetermined value, the integration determination unit 1252 determines that the user speech does not continue (first determination), and stores the speech discontinuation flag as the speech continuation determination result 1233 in the storage unit 123.

In a case in which the user status information 1232 in the wait time indicates different values, the integration determination unit 1252 may determine that the user status information 1232 in the wait time indicates the predetermined value when a majority of the values indicated by the user status information 1232 in the wait time satisfy the predetermined value. In the example illustrated in FIG. 8, for example, with the data ID 182 indicating "1", the user status indicates that the text input field is being selected for four seconds (between "2" to "5" indicated by the time 221) in the wait time of five seconds. Thus, the integration determination unit 1252 determines that the user status information 1232 in the wait time indicates the predetermined value.

FIG. 10 is a diagram illustrating an exemplary speech continuation determination result 1233 according to Embodiment 1. Any element identical to that in FIG. 7 is denoted by an identical reference sign.

As illustrated in FIG. 10, the speech continuation determination result 1233 includes a determination result 231 indicating speech continuation determination 232 for the user sentence 185 included in the estimation result 191 illustrated in FIG. 7. In other words, each determination result 231 includes the system intention 183, the system sentence 184, the user sentence 185, and the predicted response delay amount 192, and the speech continuation determination 232, to which the data ID 182 is provided. The speech continuation determination 232 indicates a result of the determination by the integration determination unit 1252, which is the value "1" indicating the speech continuation flag or the value "0" indicating the speech discontinuation flag.

[Operation of Speech Continuation Determination System 1]

The following describes operation of the speech continuation determination system 1 configured as described above.

Figure 11:
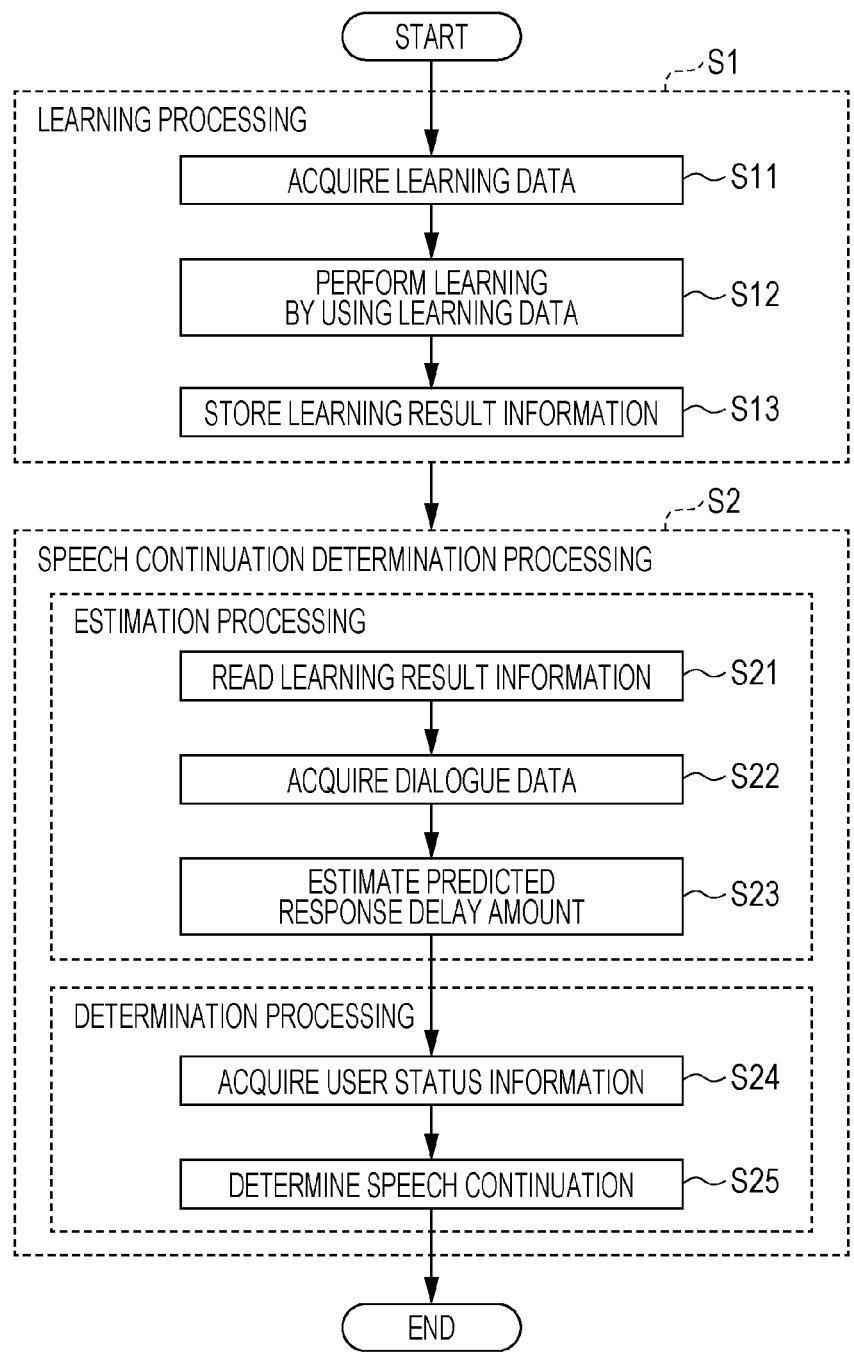
FIG. 11 is a flowchart illustrating the outline of operation of the speech continuation determination system according to Embodiment 1.

FIG. 11 is a flowchart illustrating the outline of operation of the speech continuation determination system 1 according to Embodiment 1.

First, the speech continuation determination system 1 performs, by using the learning data 1011 included in the corpus 101, learning processing to learn the response delay amount illustrating a wait time until a response sentence is output, in other words, a wait time for a response to user speech (S1). More specifically, at S1, the learning processing device 11 first acquires the learning data 1011 from the corpus 101 stored in the storage device 10 (S11). Then, the learning processing device 11 performs learning of a predetermined model for estimating the response delay amount by using the learning data 1011 acquired at S11 (S12). Then, the learning processing device 11 stores, as the learning result information 1131, a learning parameter such as a weight of the model as a result of the learning at S11 (S13).

Subsequently, the speech continuation determination system 1 determines user speech continuation by using a result of the learning processing at S1 (S2).

More specifically, at S2, the speech continuation determination device 12 first performs estimation processing and then performs determination processing. In other words, the speech continuation determination device 12 reads the learning result information 1131 as the result of the learning processing at S1 (S21), and reflects the result onto the predetermined model. Then, the speech continuation determination device 12 acquires the dialogue data 102 stored in the storage device 10 (S22). Then, the speech continuation determination device 12 estimates the predicted response delay amount 192 for the user sentence 185 included in the dialogue data 102 by using the predetermined model on which the learning result information 1131 is reflected (S23). Then, the speech continuation determination device 12 acquires the user status information 1232 indicating the user status (S24), and determines whether the user speech continues in accordance with the user status information 1232 in the wait time indicated by the predicted response delay amount 192 (S25).

<Operation of Learning Processing Device 11>

The following describes in detail the learning processing (S1) performed by the learning processing device 11.

Figure 12:
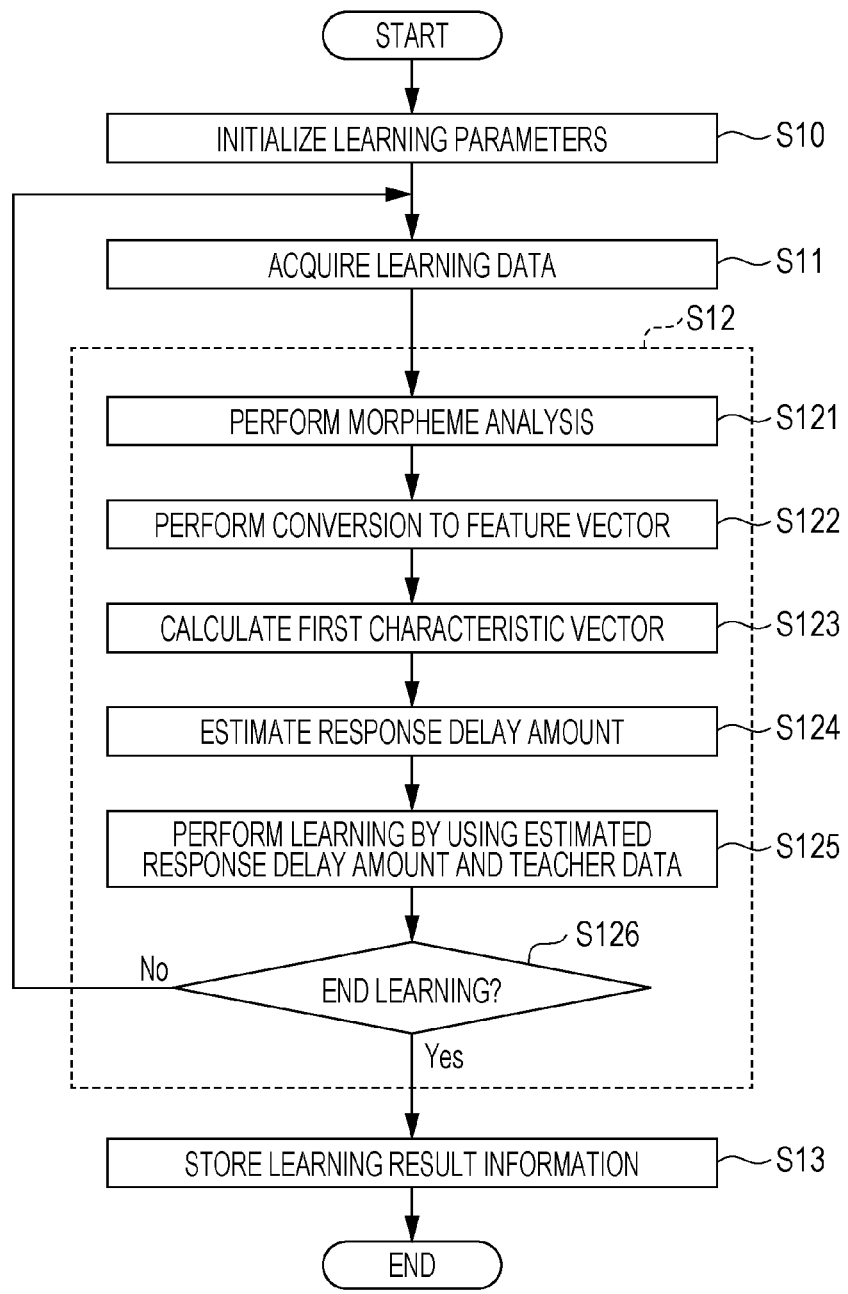
FIG. 12 is a detailed flowchart of learning processing according to Embodiment 1.

FIG. 12 is a detailed flowchart of the learning processing according to Embodiment 1. Any element identical to that in FIG. 11 is denoted by an identical reference sign. The following description is made with the example illustrated in FIG. 3 or any other drawing.

First, the learning processing device 11 initializes all weight parameters as learning targets (S10). Specifically, the learning processing device 11 initializes the first weight parameter and the second weight parameter (learning parameters) of the first model and the second model included in the predetermined model based on a pseudo random number table.

Subsequently, the learning processing device 11 acquires the learning data 1011 (S11). Specifically, the learning processing device 11 acquires one of a plurality of pieces of the learning data 1011 included in the corpus 101 stored in the storage device 10.

Subsequently, the learning processing device 11 performs learning by using the learning data 1011 acquired at S11 (S12). Specifically, the learning processing device 11 uses, as teacher data, the response delay amount 146 included in the learning data 1011 acquired at S11. The learning processing device 11 causes the predetermined model to learn the correspondence between the user sentence 145 as a learning processing target and the response delay amount 146 by using the teacher data.

More specifically, as illustrated in FIG. 12, at S12, the learning processing device 11 first converts each user sentence 145 acquired at S11 into a word string through morpheme analysis (S121).

Then, the learning processing device 11 converts the word string obtained at S121 and a dialogue action and a keyword included in the system intention 143 into a feature vector in which the word string, the dialogue action, and the keyword included are expressed as features (S122).

Then, the learning processing device 11 calculates, by using the predetermined model, the first characteristic vector indicating a dialogue state from the feature vector obtained through the conversion at S122 (S123). Specifically, the learning processing device 11 calculates, by using the first model included in the predetermined model, the first characteristic vector indicating a dialogue state based on the feature vector obtained through the conversion at S122 and the first weight parameter.

Then, the learning processing device 11 estimates, by using the predetermined model, the response delay amount for the user sentence 145 from the first characteristic vector calculated at S123 (S124). Specifically, the learning processing device 11 calculates, by using the second model included in the predetermined model, the posterior probability indicating the probability distribution of the response delay amount (zero or one) for the user sentence 145 based on the first characteristic vector calculated at S123 and the second weight parameter.

Then, the learning processing device 11 update the learning parameters by using the response delay amount estimated at S124 and the response delay amount 146 included in the learning data 1011 as the teacher data (S125). Specifically, the learning processing device 11 updates, based on the posterior probability of the response delay amount for the user sentence 145, which is calculated at S123, and the response delay amount that is a true value (teacher data) indicated by the response delay amount 146 included in the learning data 1011, the first and second weight parameters so that the prediction error between the posterior probability and the true value is minimized.

Then, the learning processing device 11 determines whether to end the learning processing at S12 (S126). When the learning processing at S12 is not to be ended (No at S126), the learning processing device 11 returns to S11 to acquire the learning data 1011 with the next data ID 142 or any other learning data 1011 and then performs the learning processing at S12. Accordingly, the learning processing device 11 repeatedly executes the learning processing while changing the learning data 1011 as a learning processing target, until learning converges.

When the learning processing is to be ended (Yes at S126), the learning processing device 11 stores, in the storage unit 113, the learning result information 1131 indicating a result of the learning processing (S13). Specifically, the learning processing device 11 stores the first and second weight parameters (learning parameters) when the learning processing ends, as the learning result information 1131 in the storage unit 113. When the error is not further reduced through the learning repetition, the learning processing device 11 determines that the prediction error from the true value is minimized, and ends the learning processing.

The following describes an example in which the learning processing device 11 performs the learning processing with the learning data 1011 illustrated in FIG. 3.

The learning processing device 11 performs the learning processing with the training data 141 in which the data ID 142 indicates "1", the system intention 143 indicates "YES/NO question <Kaisendon>", and the user sentence 145 indicates "I had fish food yesterday, (kinousakanawotabetanode,)". In this case, the learning processing device 11 calculates, by using the first model, the first characteristic vector on which the words "node" and "," included in the user sentence 145 are reflected as important characteristics, and learns, by using the second model, the first and second weight parameters, which associate the important characteristics and the response delay amount for the user sentence 145, from the first characteristic vector so that the response delay amount is estimated to be one. Then, the learning processing device 11 sequentially performs such learning processing at each increment of the value of the data ID 142.

For example, the learning processing device 11 performs the learning processing with the training data 141 in which the data ID 142 indicates "4", the system intention 143 indicates "open question", and the user sentence 145 indicates "Hello". In this case, the learning processing device 11 calculates, by using the first model, the first characteristic vector on which "open question" and "Hello" are reflected as important characteristics, and learns, by using the second model, the first and second weight parameters, which associate the important characteristics and the response delay amount, from the first characteristic vector so that the response delay amount for the user sentence 145 is estimated to be one.

The same procedure is applied when the learning processing device 11 performs the learning processing with the learning data 1011 including, as the training data 141, the system intention 183 and the user sentence 185 as illustrated in FIG. 7. Specifically, the learning processing device 11 performs the learning processing with the training data 141 in which the data ID 182 indicates "1", the system intention 183 indicates "YES/NO question <Chinese food>", and the user sentence 185 indicates "I've just had Chinese food, (chuukaryouriwotabetabakarinanode,)". In this case, the learning processing device 11 may calculate, by using the first model, the first characteristic vector on which the words "nanode" and "," included in the user sentence 145 are reflected as important characteristics, and learn, by using the second model, the first and second weight parameters, which associate the important characteristics and the response delay amount, from the first characteristic vector so that the response delay amount for the user sentence 145 is estimated to be one. Then, the learning processing device 11 may sequentially perform such learning processing at each increment of the value of the data ID 182.

<Operation of Speech Continuation Determination Device 12>

The following describes in detail speech continuation determination performed by the speech continuation determination device 12.

Figure 13:
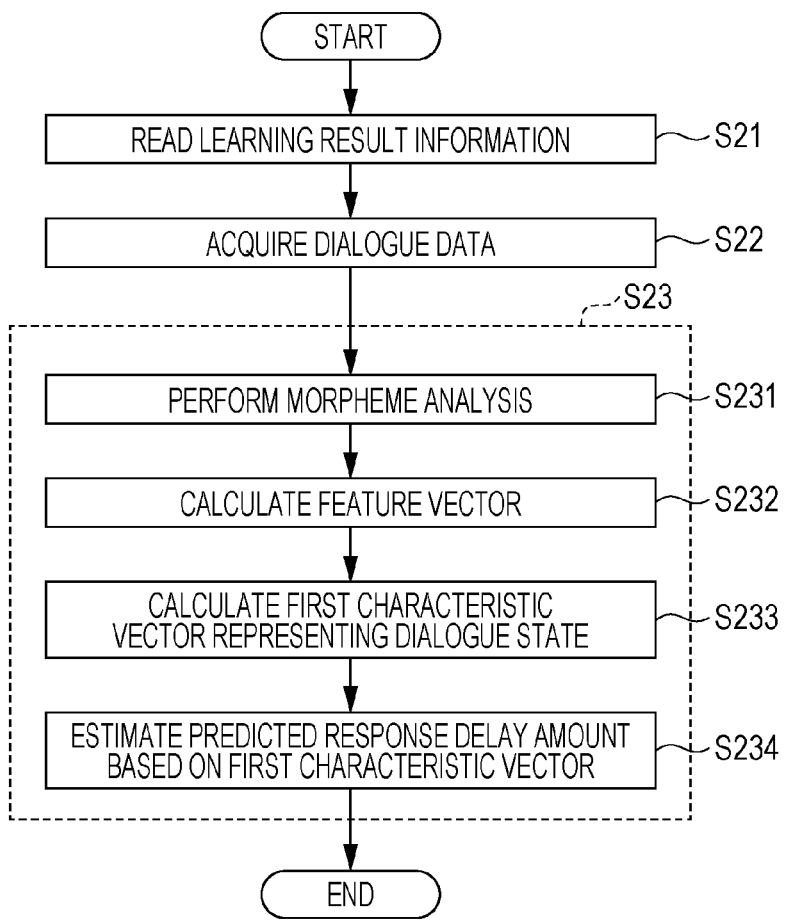
FIG. 13 is a flowchart illustrating details of estimation processing illustrated in FIG. 11.

FIG. 13 is a flowchart illustrating details of the estimation processing illustrated in FIG. 11. Any element identical to that in FIG. 11 is denoted by an identical reference sign.

First at S21, the speech continuation determination device 12 reads the learning result information 1131 as the result of the learning processing at S1, and reflects the learning result information 1131 onto the predetermined model. More specifically, the speech continuation determination device 12 reads the learning result information 1131, and reflects the learning result information 1131 onto the first weight parameter of the first model and the second weight parameter of the second model.

Subsequently at S22, the speech continuation determination device 12 acquires the dialogue data 102 stored in the storage device 10. Specifically, in the example illustrated in FIG. 5, the speech continuation determination device 12 acquires the dialogue data 102 including the system sentence 184 at the first time, the user sentence 185 spoken by the user at the second time following the system sentence 184, and structured data that is data obtained by structuring intention indicated by the system sentence 184.

Subsequently, the speech continuation determination device 12 converts each dialogue data 102 acquired at S21 into a word string through morpheme analysis (S231). Specifically, the speech continuation determination device 12 converts each user sentence 185 included in the speech data 181 acquired at S21 into a word string by dividing the user sentence 185 into words through morpheme analysis.

Subsequently, the speech continuation determination device 12 calculates a feature vector based on the word string obtained at S231 (S232). Specifically, the speech continuation determination device 12 converts the word string obtained at S121, and a dialogue action and a keyword included in the system intention 183 of the speech data 181 acquired at S21 into a feature vector in which the word string, the dialogue action, and the keyword are expressed as features.

Subsequently, the speech continuation determination device 12 calculates, by using the predetermined model subjected to learning, the first characteristic vector indicating a dialogue state from the feature vector calculated at S232 (S233). Specifically, the speech continuation determination device 12 calculates, by using the first model subjected to learning, the first characteristic vector indicating a dialogue state based on the feature vector calculated at S232 and the first weight parameter subjected to learning.

Subsequently, the speech continuation determination device 12 estimates, by using the predetermined model subjected to learning, the predicted response delay amount based on the first characteristic vector calculated at S233 (S234). Specifically, the speech continuation determination device 12 calculates, by using the second model subjected to learning, the posterior probability indicating the probability distribution of the response delay amount for the user sentence 185 based on the first characteristic vector calculated at S233 and the second weight parameter subjected to learning. Then, the speech continuation determination device 12 estimates the predicted response delay amount for the user sentence 185 by determining the predicted response delay amount 192 based on the posterior probability of the response delay amount, which is obtained at S234. The speech continuation determination device 12 stores the predicted response delay amount 192 as the response delay estimation result 1231 in the storage unit 123.

In this manner, the speech continuation determination device 12 estimates the predicted response delay amount 192 for the user sentence 185 by applying the dialogue data 102 to the predetermined model based on the learning result information 1131.

The following describes the determination processing performed by the speech continuation determination device 12.

Figure 14:
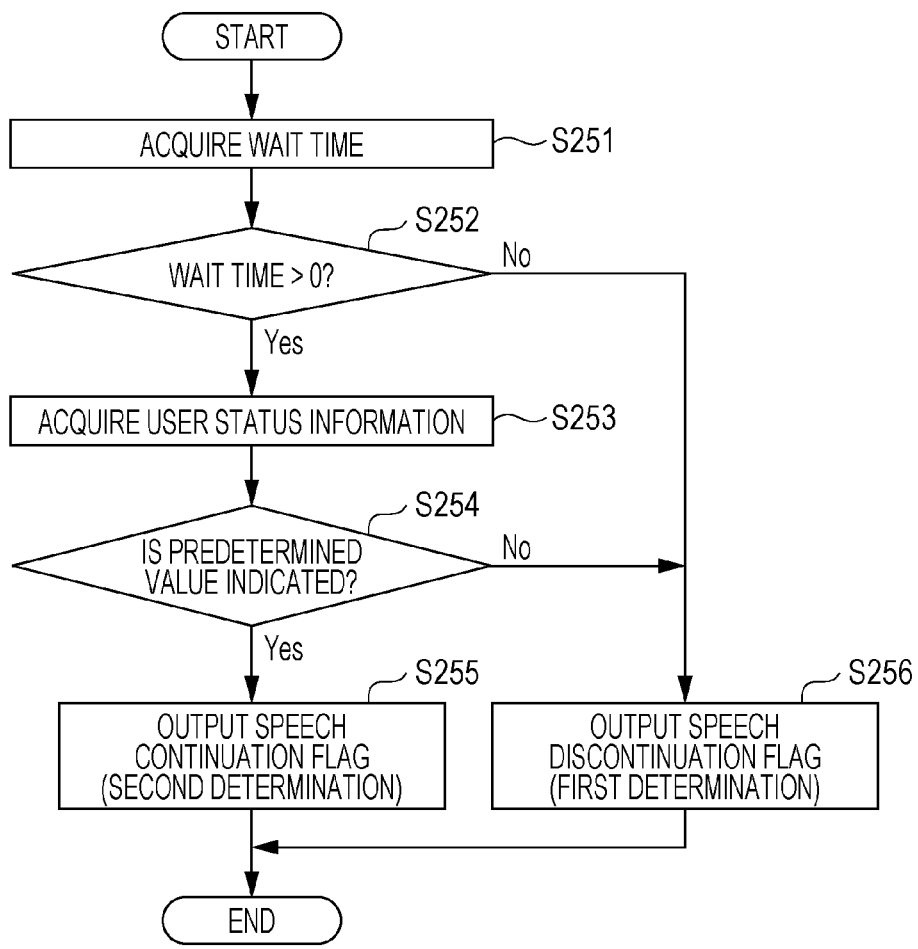
FIG. 14 is a flowchart illustrating details of the determination processing illustrated in FIG. 11.

FIG. 14 is a flowchart illustrating details of the determination processing illustrated in FIG. 11. FIG. 14 illustrates details of S25 illustrated in FIG. 11, in particular.

First, the speech continuation determination device 12 reads the response delay estimation result 1231 stored in the storage unit 123, and acquires the wait time indicated by the response delay estimation result 1231 (S251).

Subsequently, the speech continuation determination device 12 determines whether there is the wait time acquired at S251, in other words, whether the wait time is larger than zero (S252).

When the wait time is larger than zero at S252 (Yes at S252), the speech continuation determination device 12 acquires the user status information 1232 in the wait time, which is stored in the storage unit 123 (S253). Specifically, when the wait time is larger than zero, the speech continuation determination device 12 first issues a transition command for transition to the waiting state to the system that outputs a system sentence. The transition command includes a command instructing the system not to output the system sentence 184 following the user sentence 185 until a predetermined time, such as five seconds, associated with the wait time or the wait time elapses. Then, the speech continuation determination device 12 acquires the user status information 1232 in the wait time, which is stored in the storage unit 123. The speech continuation determination device 12 sequentially acquires the user status information 1232 and stores the user status information 1232 in the storage unit 123 in a manner similar to S24 illustrated in FIG. 11, but may acquire the user status information 1232 and store the user status information 1232 in the storage unit 123 at the determination at S252 or the start of the wait time.

Subsequently, the speech continuation determination device 12 determines whether the user status information 1232 in the wait time, which is acquired at S253 indicates a predetermined value (S254).

When the user status information 1232 in the wait time indicates the predetermined value at S254 (Yes at S254), the speech continuation determination device 12 determines that the user speech continues (second determination) and outputs the speech continuation flag (S255). When the user status information 1232 in the wait time does not indicate the predetermined value at S254 (No at S254), the speech continuation determination device 12 determines that the user speech does not continue (first determination), and outputs the speech discontinuation flag (S256).

When the wait time is zero at S252 (No at S252), the speech continuation determination device 12 determines that the user speech does not continue (first determination), and outputs the speech discontinuation flag (S256).

As described above, the speech continuation determination device 12 performs the outputting by storing the speech continuation flag or the speech discontinuation flag as the speech continuation determination result 1233 in the storage unit 123.

Figure 15A:
FIG. 15A is a diagram for description of an aspect of first determination according to Embodiment 1.
Figure 15B:
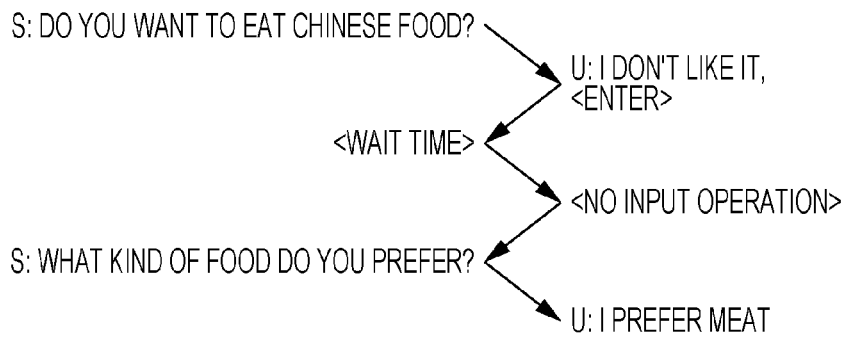
FIG. 15B is a diagram for description of another aspect of the first determination according to Embodiment 1.
Figure 15C:
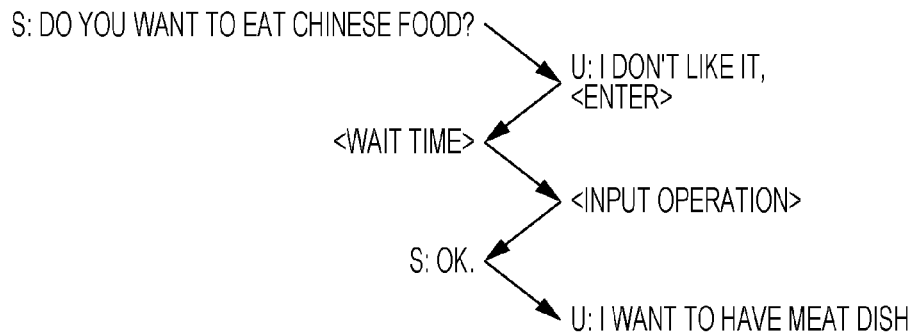
FIG. 15C is a diagram for description of an aspect of second determination according to Embodiment 1.

The following describes an aspect of the speech continuation determination processing with reference to, for example, FIGS. 15A to 15C.

FIGS. 15A and 15B is a diagram for description of an aspect of the first determination according to Embodiment 1. FIG. 15C is a diagram for description of an aspect of the second determination according to Embodiment 1.

In the example illustrated in FIG. 15A, the system (in FIGS. 15A, 15B, and 15C, S:) first outputs, to the user, the system sentence 184 of "Do you want to eat Chinese food?", the system intention 143 of which indicates "YES/NO question <Chinese food>", and then the user (in FIGS. 15A, 15B, and 15C, U:) responds the user sentence 145 of "No". In the example illustrated in FIG. 15A, the user responds one speech sentence by inputting "No" to the text input field and pressing <enter>. In this case, the speech continuation determination device 12 performs the first determination by estimating the predicted response delay amount 192 indicating that there is no wait time (wait time=0) for the user sentence 145, and outputs the speech discontinuation flag to the system. Then, in response to the speech discontinuation flag, the system outputs the system sentence 184 of "What kind of food do you prefer?", the system intention 143 of which is "check question", to the user following the user sentence 145 of "No" (in other words, with no wait time).

In the example illustrated in FIG. 15B, the system first outputs the system sentence 184 of "Do you want to eat Chinese food?", which is same as that in FIG. 15A, to the user, and then the user responds the user sentence 145 of "I don't like it". In the example illustrated in FIG. 15B, too, the user responds one speech sentence by inputting "I don't like it" to the text input field and pressing <enter>. In this case, the speech continuation determination device 12 estimates the predicted response delay amount indicating that there is a wait time (wait time >0) for the user sentence 145, but performs the first determination because the user status information 1232 acquired in the wait time does not indicate a predetermined value, and then outputs the speech discontinuation flag to the system. Specifically, in the example illustrated in FIG. 15B, the user status information 1232 acquired in the wait time indicates a value other than a predetermined value corresponding to no new input operation by the user. Then, in response to the speech discontinuation flag, the system outputs the system sentence 184 of "What kind of food do you prefer?", the system intention 143 of which indicates "check question", to the user after the wait time for the user sentence 145 of "I don't like it" elapses. The user responds the user sentence 145 of "I prefer meat" in response to the system sentence 184 of "What kind of food do you prefer?".

In the example illustrated in FIG. 15C, the system first outputs the system sentence 184 of "Do you want to eat Chinese food?", which is same as that in FIG. 15A, to the user, and then the user responds the user sentence 145 of "I don't like it", which is same as that in FIG. 15B. In this case, the speech continuation determination device 12 estimates the predicted response delay amount indicating that there is a wait time (wait time >0) for the user sentence 145, and performs the second determination because the user status information 1232 acquired in the wait time indicates a predetermined value, and then outputs the speech continuation flag to the system. Specifically, in the example illustrated in FIG. 15C, the user status information 1232 acquired in the wait time indicates a predetermined value corresponding to input operation by the user. Then, in response to the speech continuation flag, the system outputs the system sentence 184 of "OK.", the system intention 143 of which indicates "connection to user speech", to the user after the wait time for the user sentence 145 of "I don't like it" elapses. In the time of connection such as the system sentence 184 of "OK.", the user completes the input operation and responds the user sentence 145 of "I want to have meat dish".

Effects and Others

As described above, according to the present embodiment, learning data including system intention of a past system speech sentence and a user speech sentence in response to the past system speech sentence is used to perform learning processing of learning the correspondence between the user speech sentence included in the learning data and a response delay amount for the user speech sentence by using the response delay amount as teacher data.

Accordingly, the response delay amount is accurately estimated from the user speech sentence following the system speech sentence.

According to the present embodiment, the response delay amount for the user speech sentence is estimated by using a result of the learning processing, and whether the user speech continues is determined by using a user status in a wait time indicated by the estimated response delay amount. In this manner, for example, according to the speech continuation determination method or the speech continuation determination device according to the present embodiment, the accuracy of the user speech continuation determination is improved by performing the user speech continuation determination at two stages.

Accordingly, the system can avoid, for example, miss of the content of user speech, which leads to smoother interaction between the system and the user.

Embodiment 2

The following describes Embodiment 2 of the present disclosure, which is usage of the above-described speech continuation determination device 12.

Figure 16:
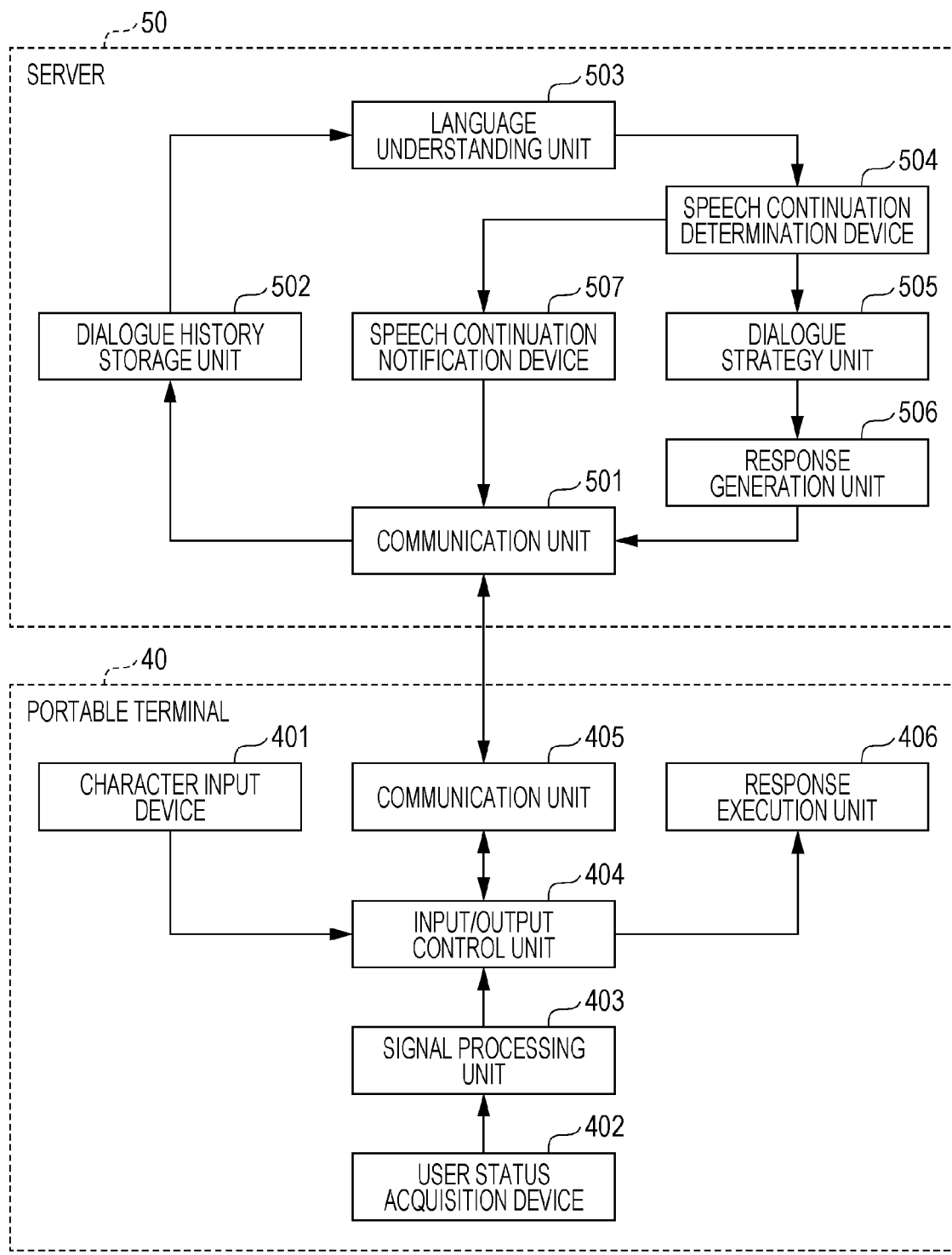
FIG. 16 is a block diagram illustrating an exemplary configuration of a dialogue system according to Embodiment 2.

FIG. 16 is a block diagram illustrating an exemplary configuration of a dialogue system according to Embodiment 2. The dialogue system has a voice recognition function and includes a portable terminal 40 such as a smartphone, and a server 50 on a cloud. The user can have dialogue with the system in natural language by voice through the portable terminal 40. The portable terminal 40 and the server 50 are connected with each other through a public communication network such as the Internet.

<Portable Terminal 40>

The portable terminal 40 is, for example, a smartphone or a tablet. The portable terminal 40 includes a character input device 401, a user status acquisition device 402, a signal processing unit 403, an input/output control unit 404, a communication unit 405, and a response execution unit 406.

The character input device 401 is used to input characters. The character input device 401 converts a result of inputting through, for example, a keyboard into a string, and outputs the string to the input/output control unit 404. The character input device 401 is merely exemplary, and may include a microphone and convert user speech input by sound into characters.

The user status acquisition device 402 is used to acquire sensor information indicating the status of the user. The user status acquisition device 402 measures the operation state of, for example, a keyboard or a mouse, and outputs sensor information including a result of the measurement to the signal processing unit 403. The user status acquisition device 402 may further include a voice input unit such as a microphone for inputting user speech by sound and receive a voice signal from the voice input unit. The user status acquisition device 402 may further include a sight line detection unit such as a camera for detecting the sight line of the user and sense whether the position of the sight line of the user at the sight line detection unit is on a display unit of the portable terminal 40. The user status acquisition device 402 may further include a posture detection unit such as a camera for detecting the posture of the user and sense whether face and body directions of the user at the posture detection unit point to the display unit of the portable terminal 40. In these cases, the display unit corresponds to the presentation unit described in Embodiment 1 and presents (displays) the system sentence 184 (first sentence) output from the server 50.

The signal processing unit 403 converts the sensor information acquired by the user status acquisition device 402 into flag information indicating whether the user is operating the keyboard or the mouse, and outputs the flag information to the input/output control unit 404.

The input/output control unit 404 outputs, to the communication unit 405, a signal representing a string input through the character input device 401 and a signal representing the flag information input by the signal processing unit 403. The input/output control unit 404 outputs, to the response execution unit 406, a signal received from the communication unit 405.

The communication unit 405 converts a signal input from the input/output control unit 404 into a communication signal having a format that enables communication, and transmits the communication signal thus obtained to the server 50 (communication unit 405). The communication unit 405 outputs the communication signal received from the server 50 to the input/output control unit 404.

The response execution unit 406 displays, on a monitor, a response sentence indicated by the communication signal received from the server 50 by the input/output control unit 404. The response execution unit 406 causes a display unit such as a display to display that the response execution unit 406 is "waiting" in a wait time indicated by a response delay amount indicated by the signal received from the server 50 by the input/output control unit 404.

<Server 50>

The server 50 includes a communication unit 501, a dialogue history storage unit 502, a language understanding unit 503, a speech continuation determination device 504, a dialogue strategy unit 505, a response generation unit 506, and a speech continuation notification device 507.

The communication unit 501 receives a communication signal from the portable terminal 40. The communication unit 501 extracts signals representing a string and flag information from the received communication signal, and outputs the extracted signals to the dialogue history storage unit 502. The communication unit 501 converts the signals representing string and flag information and received from the speech continuation notification device 507 and the response generation unit 506 into communication signals having a format that enables communication, and outputs the communication signals thus obtained to the portable terminal 40 (communication unit 405).

The dialogue history storage unit 502 generates text data of user speech by analyzing the extracted signal representing a string, and records the text data in association with the data ID and the current time. The dialogue history storage unit 502 generates user status information indicating whether the user is inputting text by analyzing the extracted signal representing flag information, and records the generated user status information in association with the data ID and the current time. The dialogue history storage unit 502 records, in association with the data ID and the current time, a response sentence received from the response generation unit 506 by the communication unit 501 and the intention of the response sentence.

The language understanding unit 503 estimates a dialogue action and a keyword that indicate the intention of a user speech sentence by using the text data generated by the dialogue history storage unit 502, and outputs a result of the estimation.

The speech continuation determination device 504 is, for example, the speech continuation determination device 12 illustrated in FIG. 1. The above-described learning processing is already completed for the speech continuation determination device 504. The speech continuation determination device 504 generates the above-described dialogue data 102 by using the text data generated by the dialogue history storage unit 502, performs predicted response delay amount estimation and speech continuation determination by using the dialogue data 102, and outputs the speech continuation determination result 1233 to the dialogue strategy unit 505. The speech continuation determination device 504 outputs generation of a wait time and a speech continuation flag to the speech continuation notification device 507.

Only when a speech discontinuation flag is output from the speech continuation determination device 504, the dialogue strategy unit 505 holds results of the dialogue action and keyword estimation by the language understanding unit 503 in a temporally sequential order, and outputs, based on the order, a dialogue action and a keyword to be responded from the system.

The response generation unit 506 generates a response sentence corresponding to the dialogue action received from the dialogue strategy unit 505. The communication unit 501 converts the generated response sentence into a communication signal having a format that enables communication, and transmits the communication signal thus obtained to the portable terminal 40.

When having received the generation of a wait time and a speech continuation flag, the speech continuation notification device 507 notifies, in the wait time, the communication unit 501 that the system is waiting for inputting from the user, or outputs, when the speech continuation flag is generated, a response sentence prompting the user for speech to the communication unit 501.

In this manner, in the dialogue system as illustrated in FIG. 16, the server 50 appropriately determines whether user speech continues by using the speech continuation determination device 12 subjected to the learning processing described in Embodiment 1. Accordingly, the dialogue system can prevent, for example, the user speech from being missed, which leads to smooth interaction.

Although the speech continuation determination device according to the embodiments is described above, the present disclosure is not limited to the embodiments.

For example, each processing unit included in the speech continuation determination device according to the above-described embodiments is typically achieved as an LSI, which is an integrated circuit. The processing units may be achieved by individual chips, or may be partially or entirely achieved by one chip.

Integration is not limited to an LSI, but may be achieved by a dedicated circuit or a general-purpose processor. Alternatively, integration may be achieved by a field programmable gate array (FPGA) that can be programmed after LSI manufacturing, or a reconfigurable processor in which connection and setting of circuit cells inside an LSI can be reconstructed.

The present disclosure may be achieved as a speech continuation determination method to be executed by a speech continuation determination device.

In each above-described embodiment, each component may be achieved by dedicated hardware or by executing a software program suitable for the component. Each component may be achieved by a program execution unit, such as a CPU or a processor, reading and executing the software program recorded in a recording medium such as a hard disk or a semiconductor memory.

Division of functional blocks in each block diagram is merely exemplary. A plurality of functional blocks may be achieved as one functional block, one functional block may be divided into a plurality of functional blocks, or part of a function may be moved to another functional block. Functions of a plurality of functional blocks having similar functions may be processed in parallel or in time divisional manner by single hardware or software.

The execution order of steps in each flowchart is exemplarily indicated to specifically describe the present disclosure, and may be different from the above-described order. Part of each step may be executed simultaneously (in parallel) with another step.

Although the speech continuation determination device according to one or a plurality of aspects is described above based on the embodiments, the present disclosure is not limited to the present embodiments. Various modifications thought of by the skilled person in the art and provided to the present embodiment, and any configuration established by combining components in different embodiments may be included in the range of the one or the plurality of aspects without departing from the scope of the present disclosure.

The present disclosure is applicable to a speech continuation determination device and enables, for example, appropriate determination of whether user speech by voice or text continues. For example, the present disclosure is applicable to a task oriented or non task oriented dialogue system device or scheme such as a call center, medical interview dialogue, or chat dialogue, which achieve user tasks.

What is claimed is:

1. A speech continuation determination method comprising:
  acquiring, by a dialogue acquisition circuit, dialogue data including a first sentence that is text data of a first speech sentence spoken to a user at a first time, a second sentence that is text data of second speech sentence spoken by the user at a second time following the first sentence, and structured data that is data obtained by structuring intention indicated by the first sentence;
  estimating, by an estimating circuit, a response delay amount indicating a wait time for a response to the second sentence by applying the dialogue data to a model on which learning result information is acquired by machine learning reflected,
  wherein the estimating comprises:
    converting the dialogue data into a word string via morpheme analysis,
    calculating a feature vector based on the word string,
    calculating, by using the model on which learning result information is acquired, a characteristic vector indicating a dialogue state from the feature vector, and
    estimating, by using the model on which learning result information is acquired, the response delay amount based on the characteristic vector;
  acquiring, by a status acquisition circuit, user status information indicating the status of the user;
  determining, by a determination circuit, whether a speech sentence by the user continues following the second sentence in accordance with the user status information in the wait time indicated by the response delay amount;
  outputting, by the determination circuit, a speech continuation flag when the user status information indicates a predetermined value and the wait time indicated by the response delay amount is greater than zero, the speech continuation flag indicating that the speech sentence by the user is to continue following the second sentence; and
  outputting, by the determination circuit, a speech discontinuation flag, when the user status information does not indicate the predetermined value or the wait time indicated by the response delay amount is zero, the speech discontinuation flag indicating that the speech sentence by the user is to discontinue following the second sentence.

2. The speech continuation determination method according to claim 1, wherein the user status information indicates a value corresponding to at least one of (1) whether a text input field at a text input circuit for inputting speech by the user in text is being selected, (2) whether a voice signal is being input at a voice input circuit for inputting speech by the user by sound, (3) whether a position of a sight line of the user at a sight line detection circuit for detecting the sight line of the user is on a device including a presentation circuit presenting the first sentence, and (4) whether face and body directions of the user at a posture detection circuit for detecting a posture of the user point to the device including the presentation circuit presenting the first sentence.

3. The speech continuation determination method according to claim 1, wherein
  when the wait time indicated by the response delay amount is zero, the determining performs first determination indicating that the speech sentence by the user does not continue, and
  while the wait time indicated by the response delay amount is larger than zero, the determining performs second determination indicating that the speech sentence by the user continues when the user status information indicates the predetermined value in the wait time, or performs the first determination when the user status information does not indicate the predetermined value in the wait time.

4. The speech continuation determination method according to claim 1, further comprising:

acquiring, by a learning data acquisition circuit, learning data including a third sentence that is text data of a third speech sentence spoken to the user, a fourth sentence that is text data of a fourth speech sentence spoken by the user following the third sentence, structured data that is data obtained by structuring intention indicated by the third sentence, and a response delay amount indicating a wait time for a response to the fourth sentence;

causing, by a learning circuit, the model to perform learning by using the learning data; and storing, in a storage memory, a result of the learning as the learning result information, wherein the learning causes the model to learn correspondence between the fourth sentence and the response delay amount by using, as teacher data, the response delay amount included in the learning data.

5. The speech continuation determination method according to claim 4, wherein the model includes:

a first model that calculates the feature vector of features such as a word included in the word string acquired through the morpheme analysis on the fourth sentence, and a dialogue action and a keyword included in the structured data, and outputs the characteristic vector representing the dialogue state of the fourth sentence based on the calculated feature vector and a first weight parameter; and a second model that outputs a response delay amount for the fourth sentence based on the characteristic vector and a second weight parameter, wherein the learning causes the model to perform learning by using the learning data by updating the first weight parameter and the second weight parameter by an error backpropagation method based on error between the response delay amount output by the second model and the response delay amount included in the learning data.

6. The speech continuation determination method according to claim 5, wherein the first model includes a neural network that has the first weight parameter and calculates the characteristic vector from the calculated feature vector, and the second model is a neural network model that outputs sigmoid regression, a support vector machine (SVM) model, or a naive Bayes classifier.

7. The speech continuation determination method according to claim 4, wherein the learning acquires the learning data from a corpus accumulating a speech sentence spoken to a user, structured data of intention indicated by the speech sentence, a speech sentence spoken by the user following the speech sentence, and a response delay amount for the speech sentence spoken by the user.

8. The speech continuation determination method according to claim 1, wherein the intention indicated by the first sentence includes a dialogue action indicating the kind of the intention of the first sentence and obtained by classifying the first sentence based on categories and actions, and a keyword included in the first sentence.

9. The speech continuation determination method according to claim 4, wherein the intention indicated by the third sentence includes a dialogue action indicating the kind of the intention of the third sentence and obtained by classifying the third sentence based on categories and actions, and a keyword included in the third sentence.

10. A speech continuation determination device comprising:

a dialogue acquisition circuit that acquires dialogue data including a first sentence that is text data of a first speech sentence spoken to a user at a first time, a second sentence that is text data of second speech sentence spoken by the user at a second time following the first sentence, and structured data that is data obtained by structuring intention indicated by the first sentence;

an estimation circuit that estimates a response delay amount indicating a wait time for a response to the second sentence by applying the dialogue data to a model on which learning result information is acquired by machine learning reflected, wherein the estimation circuit estimates by:

converting the dialogue data into a word string via morpheme analysis, calculating a feature vector based on the word string, calculating, by using the model on which learning result information is acquired, a characteristic vector indicating a dialogue state from the feature vector, and estimating, by using the model on which learning result information is acquired, the response delay amount based on the characteristic vector;

a status acquisition circuit that acquires user status information indicating the status of the user; and a determination circuit that determines whether a speech sentence by the user continues following the second sentence in accordance with the user status information in the wait time indicated by the response delay amount, outputs a speech continuation flag when the user status information indicates a predetermined value and the wait time indicated by the response delay amount is greater than zero, the speech continuation flag indicating that the speech sentence by the user is to continue following the second sentence, and outputs a speech discontinuation flag, when the user status information does not indicate the predetermined value or the wait time indicated by the response delay amount is zero, the speech discontinuation flag indicating that the speech sentence by the user is to discontinue following the second sentence.

11. A non-transitory computer-readable recording medium storing a computer program that causes a computer to execute a process comprising:

acquiring dialogue data including a first sentence that is text data of a first speech sentence spoken to a user at a first time, a second sentence that is text data of second speech sentence spoken by the user at a second time following the first sentence, and structured data that is data obtained by structuring intention indicated by the first sentence;

estimating a response delay amount indicating a wait time for a response to the second sentence by applying the dialogue data to a model on which learning result information is acquired by machine learning reflected, wherein the estimating comprises:

converting the dialogue data into a word string via morpheme analysis, calculating a feature vector based on the word string, calculating, by using the model on which learning result information is acquired, a characteristic vector indicating a dialogue state from the feature vector, and estimating, by using the model on which learning result information is acquired,
the response delay amount based on the characteristic vector;
acquiring user status information indicating the status of the user;
determining whether a speech sentence by the user continues following the second sentence in accordance with the user status information in the wait time indicated by the response delay amount;
outputting, by the determination circuit, a speech continuation flag when the user status information indicates a predetermined value and the wait time indicated by the response delay amount is greater than zero, the speech continuation flag indicating that the speech sentence by the user is to continue following the second sentence; and
outputting, by the determination circuit, a speech discontinuation flag, when the user status information does not indicate the predetermined value or the wait time indicated by the response delay amount is zero, the speech discontinuation flag indicating that the speech sentence by the user is to discontinue following the second sentence.

* * * * *